(12) United States Patent
Xie

(10) Patent No.: US 11,157,009 B2
(45) Date of Patent: Oct. 26, 2021

(54) METHOD AND DEVICE FOR CONTROLLING FLOOR CLEANING ROBOTS

(71) Applicant: Beijing Xiaomi Mobile Software Co., Ltd., Beijing (CN)

(72) Inventor: Yan Xie, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 376 days.

(21) Appl. No.: 15/819,368

(22) Filed: Nov. 21, 2017

(65) Prior Publication Data

US 2018/0157266 A1 Jun. 7, 2018

(30) Foreign Application Priority Data

Dec. 2, 2016 (CN) .......................... 201611109688.2

(51) Int. Cl.
 *A47L 9/28* (2006.01)
 *A47L 11/40* (2006.01)
 *G05D 1/02* (2020.01)

(52) U.S. Cl.
 CPC .......... *G05D 1/0219* (2013.01); *A47L 9/2847* (2013.01); *A47L 9/2852* (2013.01);
 (Continued)

(58) Field of Classification Search
 CPC .... G05D 1/0219; G05D 1/0285; G05D 1/028; G05D 1/0253; G05D 1/0242;
 (Continued)

(56) References Cited

U.S. PATENT DOCUMENTS 8,295,978 B2   10/2012  Cho et al.
2003/0229421 A1  12/2003  Chmura et al.
(Continued)

FOREIGN PATENT DOCUMENTS

CN    1399734 A    2/2003
CN   101387876 A   3/2009
(Continued)

OTHER PUBLICATIONS

Extended European Search Report dated Jun. 6, 2018 in Patent Application No. 17205213.6, 5 pages.
(Continued)

*Primary Examiner* — Abby Y Lin
*Assistant Examiner* — Renee LaRose
(74) *Attorney, Agent, or Firm* — Oblon, McClelland, Maier & Neustadt, L.L.P.

(57) ABSTRACT

The present disclosure relates to a method and a device for controlling floor cleaning robots. The method includes obtaining cleaning task information that includes an overall cleaning task; determining cleaning control information for a plurality of floor cleaning robots based on the cleaning task information, wherein the cleaning control information includes control information for each one of the plurality of floor cleaning robots; and transmitting the cleaning control information to each one of the plurality of floor cleaning robots, so that each one of the floor cleaning robots performs a cleaning task based on the corresponding cleaning control information.

19 Claims, 24 Drawing Sheets

(52) U.S. Cl.
CPC ........... *A47L 9/2857* (2013.01); *A47L 9/2894* (2013.01); *A47L 11/4005* (2013.01); *A47L 11/4011* (2013.01); *G05D 1/028* (2013.01); *G05D 1/0242* (2013.01); *G05D 1/0253* (2013.01); *G05D 1/0285* (2013.01); *A47L 2201/04* (2013.01); *A47L 2201/06* (2013.01)

(58) Field of Classification Search
CPC ............... G05D 1/0223; A47L 11/4011; A47L 11/4005; A47L 2201/04; A47L 9/2894; A47L 9/2857; A47L 9/2852; A47L 9/2847; A47L 2201/06; H04W 4/00; G06F 9/00
See application file for complete search history.

(56) References Cited

U.S. PATENT DOCUMENTS

| | | |
|---|---|---|
| 2006/0178777 A1 | 8/2006 | Park et al. |
| 2007/0250212 A1 | 10/2007 | Halloran et al. |
| 2011/0077802 A1 | 3/2011 | Halloran et al. |
| 2013/0253701 A1 | 9/2013 | Halloran et al. |
| 2014/0207280 A1* | 7/2014 | Duffley ................ G05D 1/0016 700/257 |
| 2014/0249671 A1 | 9/2014 | Halloran et al. |
| 2015/0148951 A1* | 5/2015 | Jeon ..................... G05D 1/0274 700/248 |
| 2016/0023357 A1 | 1/2016 | Dubrovsky et al. |
| 2016/0309974 A1 | 10/2016 | Abe et al. |
| 2018/0008108 A1 | 1/2018 | Sauer et al. |

FOREIGN PATENT DOCUMENTS

| | | |
|---|---|---|
| CN | 101496706 A | 8/2009 |
| CN | 104407583 A | 3/2015 |
| CN | 104460663 A | 3/2015 |
| CN | 104536447 A | 4/2015 |
| CN | 104757908 A | 7/2015 |
| CN | 204515530 U | 7/2015 |
| CN | 104932495 A | 9/2015 |
| CN | 104950896 A | 9/2015 |
| CN | 105094011 A | 11/2015 |
| CN | 106020230 A | 10/2016 |
| CN | 106527446 A | 3/2017 |
| EP | 1 360 922 A2 | 11/2003 |
| EP | 2 466 411 A2 | 6/2012 |
| EP | 2 977 843 A1 | 1/2016 |
| EP | 3 047 772 A1 | 7/2016 |
| JP | 63-150044 A | 6/1988 |
| JP | 2003-180587 A | 7/2003 |
| JP | 2014-054335 A | 3/2014 |
| JP | 2016-513981 A | 5/2016 |
| KR | 10-2015-0061398 A | 6/2015 |
| RU | 2 242 160 C1 | 12/2004 |
| RU | 2 314 557 C2 | 1/2008 |
| RU | 2 586 197 C2 | 6/2016 |
| WO | WO 2011/082606 A1 | 7/2011 |
| WO | WO 2018/099131 A1 | 6/2018 |

OTHER PUBLICATIONS

International Search Report dated Nov. 9, 2017 in PCT/CN2017/096781 (with English translation of categories of cited documents ), 6 pages.

Combined Office Action and Search Report dated Sep. 18, 2018 in corresponding Russian Patent Application No. 2017143134/08(074365), (with English Translation of Category of Cited Documents), 8 pages.

Combined Chinese Office Action and Search Report dated Jan. 9, 2019 in corresponding Chinese Patent Application No. 201611109688.2 (with English Translation of Category of Cited Documents), 10 pages.

Office Action dated Feb. 26, 2019 in corresponding Japanese Patent Application No. 2017-553218, 8 pages.

Chinese Office Action dated Jul. 24, 2019 in Chinese Application No. 201611109688.2, 7 pages.

Chinese Office Action dated Jun. 3, 2020 in corresponding Chinese Patent Application No. 201611109688.2, (4 pages).

* cited by examiner

METHOD AND DEVICE FOR CONTROLLING FLOOR CLEANING ROBOTS

CROSS-REFERENCE TO RELATED APPLICATIONS

This application is based on and claims priority to Chinese Patent Application Serial. No. CN 201611109688.2, filed on Dec. 2, 2016, the entire contents of which are incorporated herein by reference.

TECHNICAL FIELD

The present disclosure relates to the field of manufacturing technology of household appliances, and more particularly to a method and a device for controlling floor cleaning robots.

BACKGROUND

In recent years, with the continuous development of science and technology, more and more technology products have become necessities of life, such as, washing machines, refrigerators, domestic service robots and so on. Smart floor cleaning robots have gradually occupied an increasingly important position in people's lives because they can automatically clean the floor of the house without any need of manual participation. In use, the floor cleaning robots perform cleaning work according to manually set working modes.

SUMMARY

This Summary is provided to introduce a selection of aspects of the present disclosure in a simplified form that are further described below in the Detailed Description. This Summary is not intended to identify key features or essential features of the claimed subject matter, nor is it intended to be used to limit the scope of the claimed subject matter.

Aspects of the disclosure provide a method of controlling floor cleaning robots. The method includes obtaining cleaning task information that includes an overall cleaning task; determining cleaning control information for a plurality of floor cleaning robots based on the cleaning task information, wherein the cleaning control information includes control information for each one of the plurality of floor cleaning robots; and transmitting the cleaning control information to each one of the plurality of floor cleaning robots, so that each one of the floor cleaning robots performs a cleaning task based on the corresponding cleaning control information.

The cleaning task information includes a cleaning path, and the cleaning control information includes cleaning sub-paths. When determining the cleaning control information for the plurality of floor cleaning robots based on the cleaning task information, the method includes dividing the cleaning path in the cleaning task information into a plurality of cleaning sub-paths; assigning each one of the plurality of cleaning sub-paths to at least one of the plurality of floor cleaning robots as cleaning control information for the floor cleaning robot, so that each one of the floor cleaning robots performs a cleaning task based on the corresponding cleaning sub-path.

When dividing the cleaning path in the cleaning task information into the plurality of cleaning sub-paths, the method includes one of: equally dividing the cleaning path in the cleaning task information into the plurality of cleaning sub-paths; and receiving from a user the cleaning path in the cleaning task information, which is divided into the plurality of cleaning sub-paths.

The cleaning task information includes a cleaning region, and the cleaning control information includes cleaning sub-regions. When determining the cleaning control information for the plurality of floor cleaning, robots based on the cleaning task information, the method includes dividing the cleaning region in the cleaning task information into a plurality of cleaning sub-regions; assigning each one of the plurality of cleaning sub-regions to at least one of the floor cleaning robots as cleaning control information for the floor cleaning robot, so that each one of the floor cleaning robots performs a cleaning task based on the corresponding cleaning sub-region.

When dividing the cleaning region in the cleaning task information into the plurality of cleaning sub-regions, the method includes one of: equally dividing the cleaning region in the cleaning task information into the plurality of cleaning sub-regions; and receiving from a user the cleaning region in the cleaning task information, which is divided into the plurality of cleaning sub-regions.

The cleaning task information includes a cleanliness level after cleaning, and the cleaning control information includes a cleaning mode and a cleaning start time. When determining the cleaning control information for the plurality of floor cleaning robots based on the cleaning task information, the method includes determining a cleaning mode for each one of the floor cleaning robots that performs a cleaning task on a cleaning region based on the cleanliness level after cleaning in the cleaning task information; and determining a cleaning start time in the cleaning task information, as the cleaning control information for the floor cleaning robot, so that each one of the floor cleaning robots performs a cleaning task at the corresponding cleaning start time according to the corresponding cleaning mode.

The cleaning task information includes a cleaning time duration. When determining the cleaning control information for the plurality of floor cleaning robots based on the cleaning time duration in the cleaning task information, the method includes determining a cleaning time duration for the plurality of floor cleaning robots based on the cleaning time duration in the cleaning task information, wherein the cleaning time duration of each one of the floor cleaning robots equals to the cleaning tithe duration in the cleaning task information, so that the cleaning task of each one of the floor cleaning robots is performed within the cleaning time duration of the floor cleaning robot.

The method also includes determining a main floor cleaning robot and at least one secondary floor cleaning robot from the plurality of floor cleaning robots. When determining the cleaning control information for the plurality of floor cleaning robots based on the cleaning task information, the method includes transmitting the cleaning task information to the main floor cleaning robot so that the main floor cleaning robot determines the cleaning control information for the plurality of floor cleaning robots based on the cleaning task information. The cleaning task information can include inputted cleaning task information.

The method also includes determining a main floor cleaning robot and at least one secondary floor cleaning robot from the plurality of floor cleaning robots. When transmitting the cleaning control information to the corresponding floor cleaning robots, the method includes transmitting the cleaning control information to the main floor cleaning robot, so that the main floor cleaning robot performs a cleaning task according to a cleaning control information and transmits the other cleaning control information to the at least one secondary floor cleaning robot.

Aspects of the disclosure also provide a device for controlling floor cleaning robots. The device includes circuitry configured to obtain cleaning task information that includes an overall cleaning task; determine cleaning control information for a plurality of floor cleaning robots based on the cleaning task information, wherein the cleaning control information includes control information for each one of the plurality of floor cleaning robots; and transmit the cleaning control information to each one of the plurality of floor cleaning robots, so that each one of the floor cleaning robots performs a cleaning task based on the corresponding cleaning control information.

Aspects of the disclosure also provide a device for controlling floor cleaning robots. The device includes a processor and a memory configured to store computer-readable instructions executed by the processor. The processor is configured to obtain cleaning task information that includes an overall cleaning task; determine cleaning control information for a plurality of floor cleaning robots based on the cleaning task information, wherein the cleaning control information includes control information for each one of the plurality of floor cleaning robots; and transmit the cleaning control information to each one of the plurality of floor cleaning robots, so that each one of the floor cleaning robots performs a cleaning task based on the corresponding cleaning control information.

It is to be understood that both the foregoing general description and the following detailed description are illustrative and explanatory only and are not restrictive of the present disclosure.

BRIEF DESCRIPTION OF THE DRAWINGS

The accompanying drawings, which are incorporated in and constitute a part of this specification, illustrate aspects consistent with the disclosure and, together with the description, serve to explain the principles of the disclosure.

The specific aspects of the present disclosure, which have been illustrated by the accompanying drawings described above, will be described in detail below. These accompanying drawings and description are not intended to limit the scope of the present disclosure in any manner, but to explain the concept of the present disclosure to those skilled in the art via referencing specific aspects.

DETAILED DESCRIPTION

Reference will now be made in detail to exemplary aspects, examples of which are illustrated in the accompanying drawings. The following description refers to the accompanying drawings in which the same numbers in different drawings represent the same or similar elements unless otherwise represented. The implementations set forth in the following description of illustrative aspects do not represent all implementations consistent with the disclosure. Instead, they are merely examples of apparatuses and methods consistent with aspects related to the disclosure as recited in the appended claims.

The present aspect provides a method for controlling floor cleaning robots, which is configured to control at least two floor cleaning robots to perform a cleaning task cooperatively. The method may be performed by a terminal device, including a mobile phone, a tablet, a personal computer, and etc.

Figure 1:
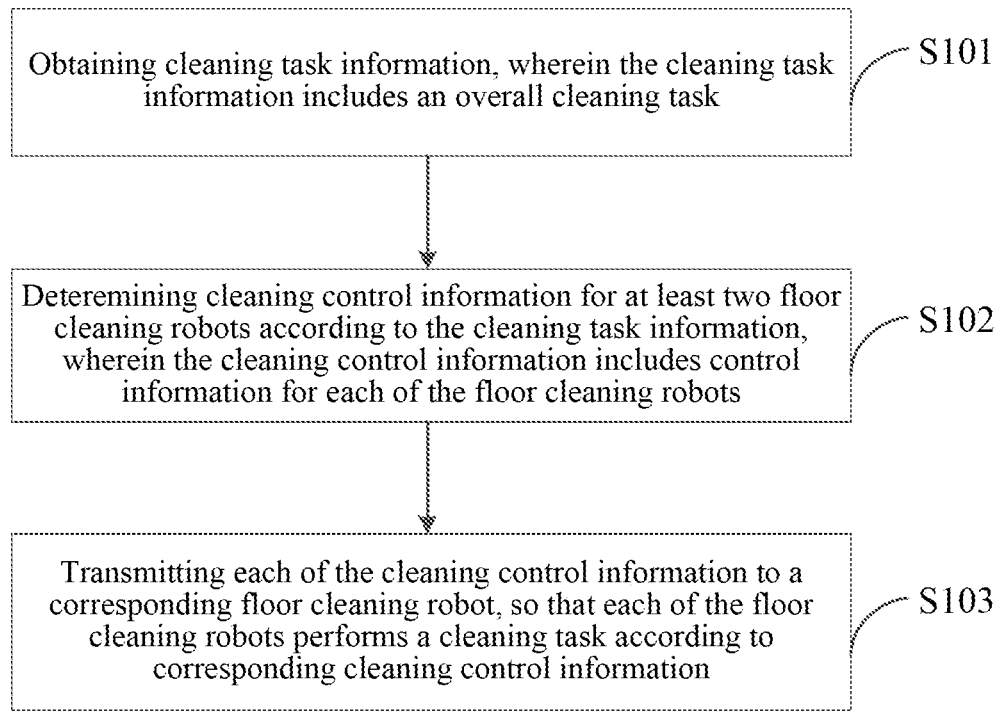
FIG. 1 is a flow diagram of a method for controlling floor cleaning robots according to an exemplary aspect of the present disclosure.

FIG. 1 is a flow diagram of a method for controlling floor cleaning robots according to an exemplary aspect. As illustrated in FIG. 1, the method for controlling floor cleaning robots includes the following steps S101-S103.

In step S101, cleaning task information is obtained, the cleaning task information includes an overall cleaning task.

In step S102, cleaning control information for at least two floor cleaning robots is determined based on the cleaning task information, the cleaning control information includes control information for each of the floor cleaning robots.

In step S103, each of the cleaning control information is transmitted to a corresponding floor cleaning robot, so that each of the floor cleaning robots performs a cleaning task according to corresponding cleaning control information.

The aspect of the present disclosure provides a method for controlling floor cleaning robots, which obtains cleaning task information including an overall cleaning task, determines the cleaning control information of at least two floor cleaning robots according to the cleaning task information, wherein the cleaning control information includes control information for each of the floor cleaning robots, and then transmits each of the cleaning control information to a corresponding floor cleaning robot so that the at least two floor cleaning robots perform the cleaning task cooperatively, thereby effectively improving the efficiency of cleaning.

In the above aspect, in order to know the correspondence relationship between the cleaning control information and the floor cleaning robots so as to allow each of the cleaning control information to be correctly transmitted to the corresponding floor cleaning robot, in an implementable way of the present disclosure, identifiers may be used to identify the floor cleaning robots. In such case, the cleaning control information of at least two floor cleaning robots that is determined according to the cleaning task information is illustrated in Table 1. Table 1 shows correspondence relationships between the identifiers of floor cleaning robots and the cleaning control information. In this way, the correspondence relationships between the identifiers of the floor cleaning robots and the cleaning control information can be clearly known when such Table 1 is available.

TABLE 1

| Identifier of floor cleaning robot 1 | Cleaning control information 1 |
|---|---|
| Identifier of floor cleaning robot 2 | Cleaning control information 2 |
| ... | ... |
| Identifier of floor cleaning robot n | Cleaning control information n |

It should be noted that, types of the floor cleaning robots can be used as the identifiers of the floor cleaning robots for identifying the floor cleaning robots; or, at least two floor cleaning robots can be numbered in advance so that serial numbers of the floor cleaning robots can be used as the identifiers of the floor cleaning robots for identifying the floor cleaning robots. The present disclosure is not intended to limit the manner of indicating the identifiers of the floor cleaning robots in any specific way.

One of implementable ways for obtaining the cleaning control information of at least two floor cleaning robots is to install control software for floor cleaning robots internally to the terminal device. The control software for floor cleaning robots can interact with the floor cleaning robots.

Figure 2:
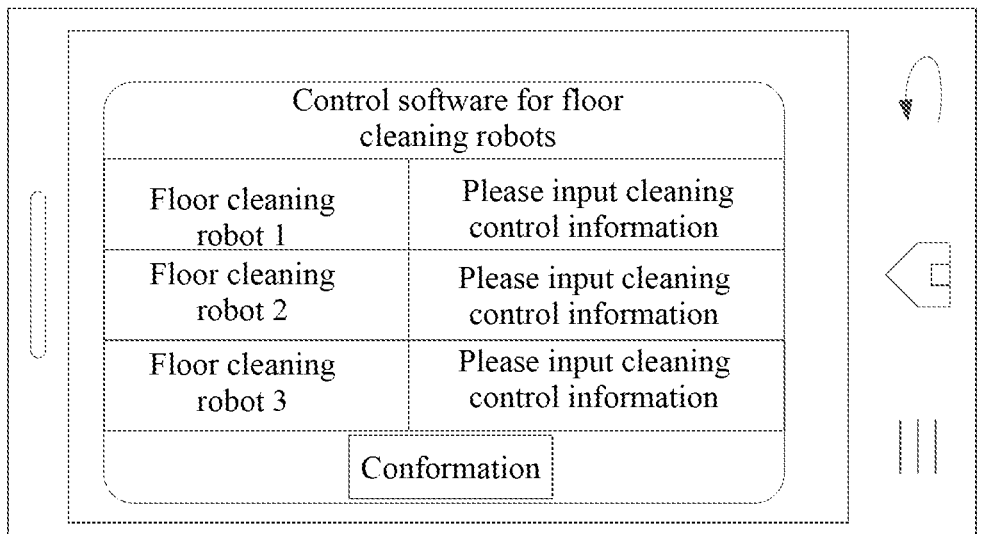
FIG. 2 is a block diagram of a display interface of control software of floor cleaning robots in a terminal device according to a first exemplary aspect of the present disclosure.

FIG. 2 is a block diagram of a display interface of the control software for floor cleaning robots in a terminal device according to a first exemplary aspect. In the present aspect, the user can manually input cleaning control information for each of the floor cleaning robots by himself/herself. As illustrated in FIG. 2, given that there are three floor cleaning robots, using serial numbers of floor cleaning robots as the identifiers thereof, a display interface of the control software for floor cleaning robots in the terminal device includes:

An identifier for each of the floor cleaning robots (floor cleaning robot 1, floor cleaning robot 2, floor cleaning robot 3), a prompt message (please input cleaning control information) that prompts the user to input cleaning control information corresponding to each of the floor cleaning robots, and a conformation button. In such a case, the user can manually input, at a location of the prompt message "please input cleaning control information", the cleaning control information to which a certain floor cleaning robot corresponds. For example, the cleaning control information includes cleaning task types and specific parameters corresponding to each of cleaning task types; and the cleaning task types can include at least one of: cleaning time duration, cleaning path, cleaning region, cleaning mode, cleaning start time and the like. After the user finishes inputting the cleaning control information, he/she can click on the confirmation button, and then the control software for floor cleaning robots in the terminal device transmits the cleaning control information for each of the floor cleaning robots to a corresponding floor cleaning robot.

Figure 3:
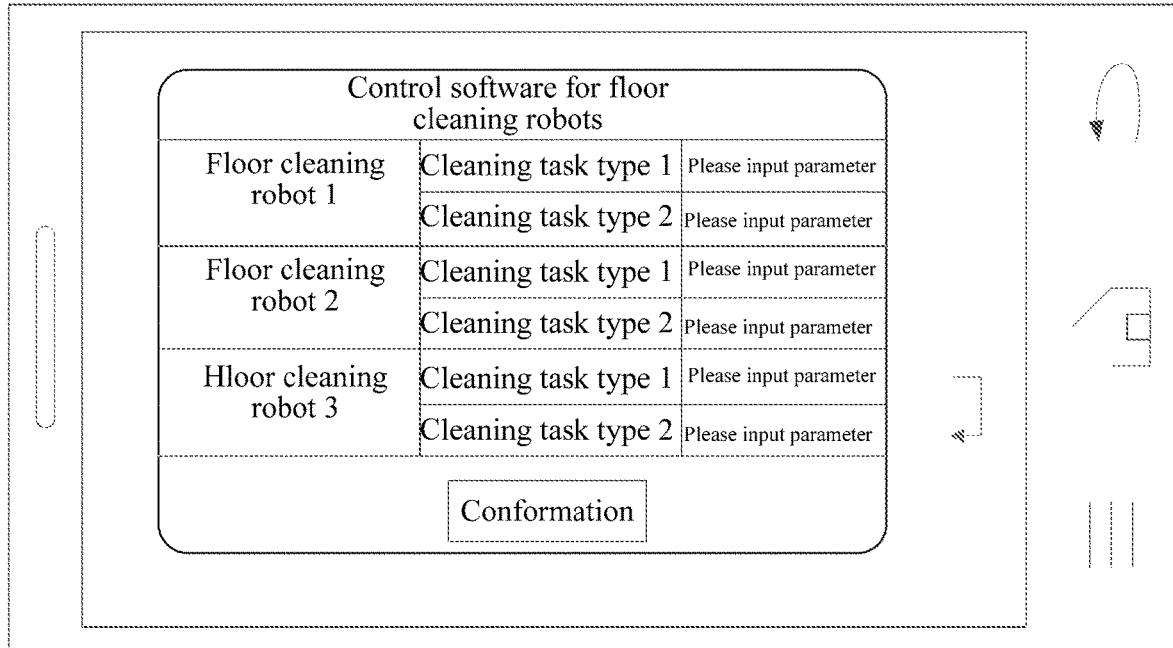
FIG. 3 is a block diagram of a display interface of control software of floor cleaning robots in a terminal device according to a second exemplary aspect of the present disclosure.

However, when the cleaning task types and the specific parameters corresponding to each of cleaning task types in the cleaning control information is manually input by the user, the user' experience will be extremely poor due to the large amount of contents need to input. FIG. 3 is a block diagram of a display interface of control software for floor cleaning robots in a terminal device according to a second exemplary aspect. As illustrated in FIG. 3, on the basis of FIG. 2, similarly, given that there are three floor cleaning robots and that serial numbers of the floor cleaning robots are used as the identifiers thereof, then a display interface of the control software of floor cleaning robots in the terminal device includes:

An identifier for each of the floor cleaning robots (floor cleaning robot 1, floor cleaning robot 2 and floor cleaning robot 3), preset various cleaning task types (cleaning task type 1 and cleaning task type 2), a prompt message (please input parameter) that prompts the user to input parameters corresponding to each of the cleaning task types and a conformation button, then the user can manually input, at a location of the prompt message "please input parameter", specific parameters of a corresponding cleaning task type which the user expects a certain floor cleaning robot to perform. For example, the cleaning control types include at least one of the following cleaning tasks: cleaning time duration, cleaning path, cleaning region, cleaning mode, cleaning start time and the like. After the user finishes inputting the cleaning control information, he/she can click on the confirmation button, and then the control software for floor cleaning robots in the terminal device transmits the cleaning control information for each of the floor cleaning robots to a corresponding floor cleaning robot.

In such case, the user is only required to input parameters corresponding to the cleaning task type without the need of inputting the cleaning task type. It should be noted that, in such case, the cleaning task types can cover all cleaning task types of the floor cleaning roots: if parameters corresponding to a certain cleaning task type is not input, then it defaults to a preset parameter, or it doesn't perform this cleaning task type, which is not particularly limited herein. More intelligently, if the cleaning task type displayed by the control software for floor cleaning robots cannot satisfy the user's requirements, then the user can further manually input desired cleaning task type(s).

Figure 4:
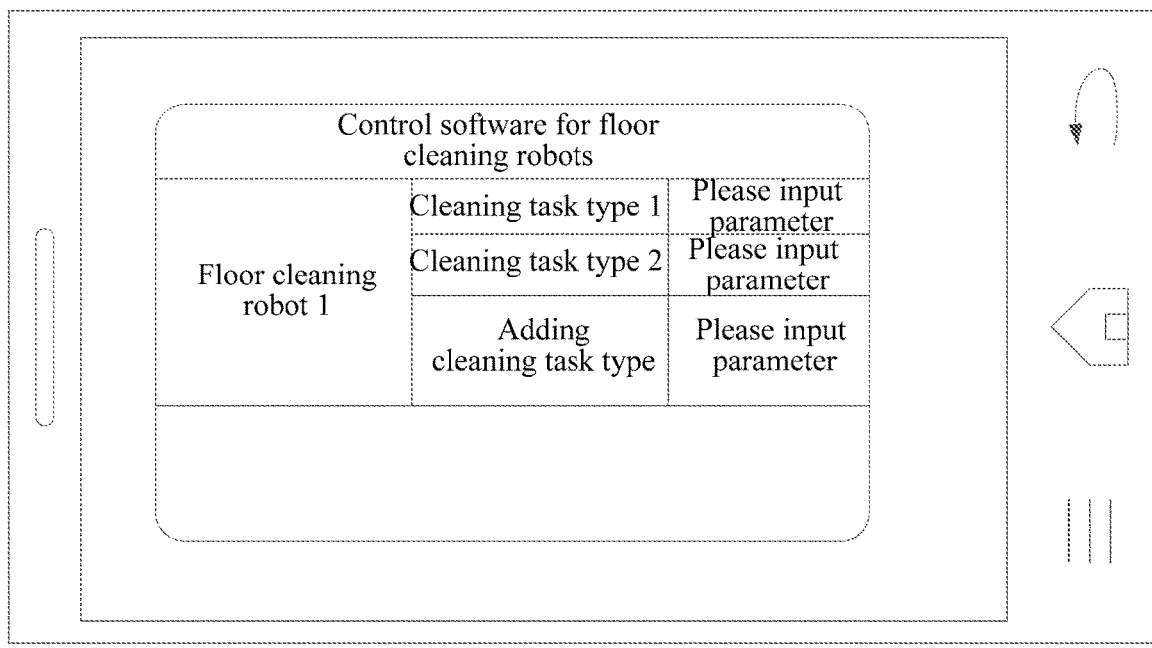
FIG. 4 is a block diagram of a display interface of control software of floor cleaning robots in a terminal device according to a third exemplary aspect of the present disclosure.

FIG. 4 is a block diagram of a display interface of the control software for floor cleaning robots in a terminal device according to a third exemplary aspect. As illustrated in FIG. 4, the present aspect will be described with reference to the floor cleaning robot 1 by way of example. On the basis of FIG. 3, an option of "adding cleaning task type" is added to the cleaning task type corresponding to which the identifier of the floor cleaning robot (floor cleaning robot 1) corresponds. When the user needs to manually input the cleaning task type, he/she can manually input, at a location of the prompt message "adding cleaning task type", a cleaning task type which the user expects a certain floor cleaning robot to perform, and then manually input parameter(s) corresponding to this cleaning task type at a next location corresponding to "please input parameter".

Figure 5:
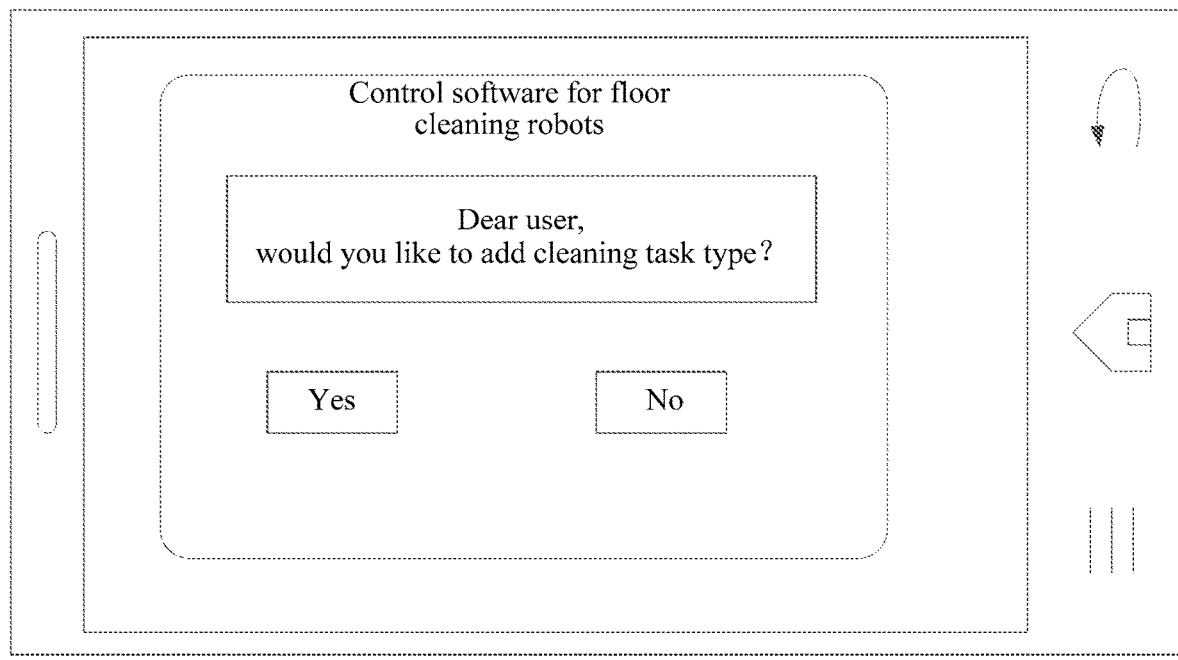
FIG. 5 is a block diagram of a display interface of control software of floor cleaning robots in a terminal device according to a fourth exemplary aspect of the present disclosure.
Figure 6:
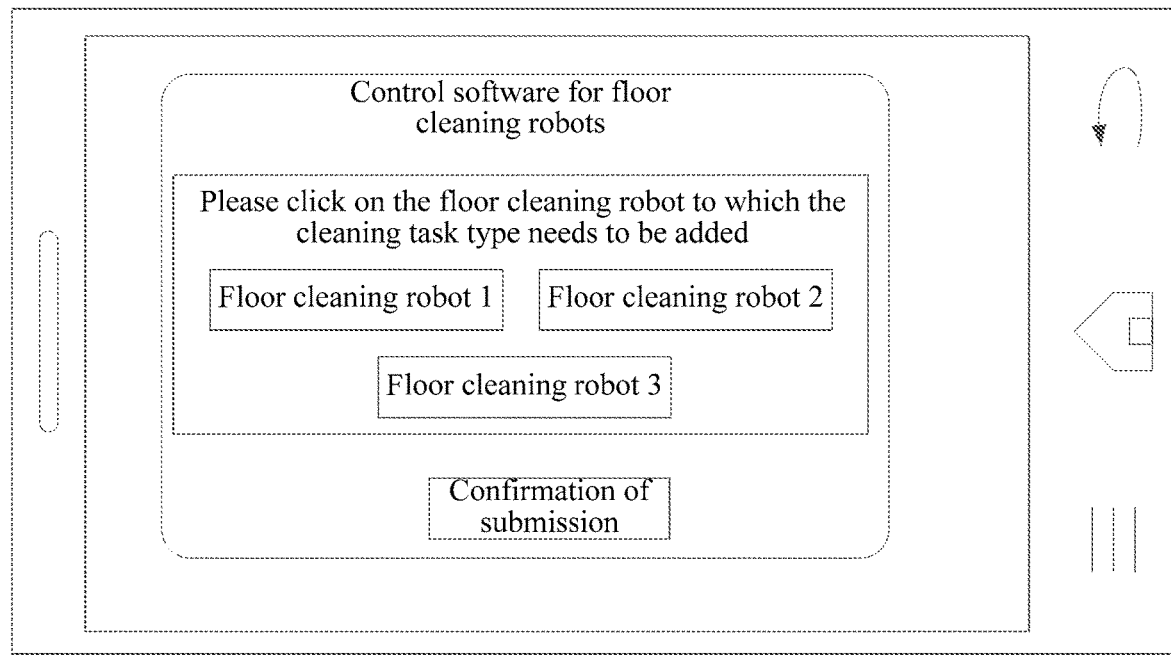
FIG. 6 is a block diagram of a display interface of control software of floor cleaning robots in a terminal device according to a fifth exemplary aspect of the present disclosure.
Figure 7:
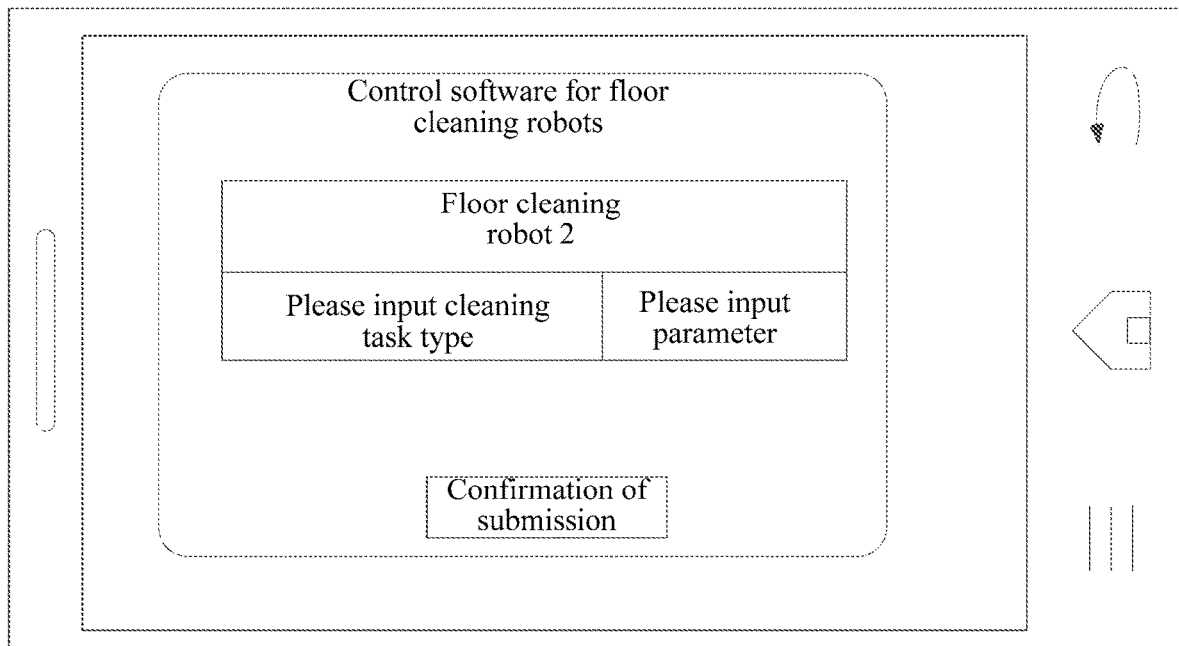
FIG. 7 is a block diagram of a display interface of control software of floor cleaning robots in a terminal device according to a sixth exemplary aspect of the present disclosure.

FIG. 5 is a block diagram of a display interface of the control software for floor cleaning robots in a terminal device according to a fourth exemplary aspect; FIG. 6 is a block diagram of a display interface of the control software for floor cleaning robots in a terminal device according to a fifth exemplary aspect; and FIG. 7 is a block diagram of a display interface of the control software for floor cleaning robots in a terminal device according to a sixth exemplary aspect. As illustrated in FIG. 5, on the basis of FIG. 3, upon the user clicking on the confirmation button to submit the cleaning control information of each of the floor cleaning robots, the display interface of the control software for floor cleaning robots can further display a prompt message "Dear user, would you like to add cleaning task type?" and buttons indicating "yes" and "no". If the user would like to add some cleaning task type, then he/she can click on the button indicating "yes"; and at this moment, the display interface of the control software for floor cleaning robots displays an interface as illustrated in FIG. 6. Since there are three floor cleaning robots in this aspect, the cleaning task type may not need to be added for every floor cleaning robot. In such case, the display interface will present a prompt message "please click on the floor cleaning robot to which the cleaning task type needs to be added" as well as buttons indicating "floor cleaning robot 1", "floor cleaning robot 2" and "floor cleaning robot 3". For example, if the user wants to add the cleaning task type of the floor cleaning robot 2, then he/she only needs to click on the button indicating "floor cleaning robot 2" and the button indicating conformation of submission. At this time, the display interface of the control software for floor cleaning robots displays an interface as illustrated in FIG. 7, then the user only needs to input the desired cleaning task type at the location of "please input cleaning task type" and input the corresponding parameter(s) at the location of "please input parameter". After the user finishes inputting, he/she can click on the button indicating "confirmation of submission", and then the control software for floor cleaning robots in the terminal device transmits the cleaning control information for each of the floor cleaning robots as input by the user to a corresponding floor cleaning robot. If the user does not want to add any cleaning task type, then he/she can click on the button indicating "no", and the control software for floor cleaning robots in the terminal device transmits the cleaning control information for each of the floor cleaning robots as input by the user to a corresponding floor cleaning robot.

Figure 8:
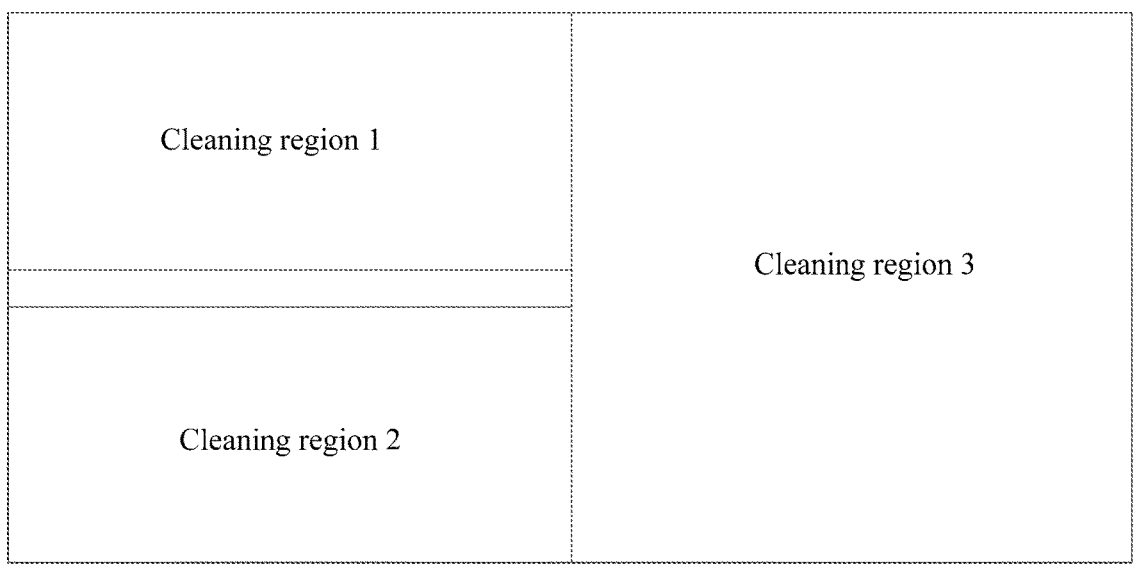
FIG. 8 is a schematic diagram of a division of a cleaning region as illustrated in an exemplary aspect of the present disclosure.

The above aspect requires the user to analyze and dissect the cleaning tasks by himself/herself to convert the cleaning task having been dissected into cleaning control information and assign the same to each of the floor cleaning robots, so that each of the floor cleaning robots can perform a cleaning task assigned thereto. Since the user can only dissect the cleaning task and assigns the cleaning control information based on his/her experiences, the result of the assignment of cleaning control information may be not ideal. That is, it may result in that the cleaning effect after cleaning is not that perfect as expected by the user. FIG. 8 is a schematic diagram of a division of a cleaning region as illustrated in an exemplary aspect. As illustrated in FIG. 8, at this moment, the user divides the cleaning region into cleaning region 1, cleaning region 2 and cleaning region 3, and instructs the floor cleaning robot 1 to perform cleaning task on the cleaning region 1, instructs the floor cleaning robot 2 to perform cleaning task on the cleaning region 2 and instructs the floor cleaning robot 3 to perform cleaning task on the cleaning region 3. Obviously, a region between the cleaning region 1 and the cleaning region 2 is not allocated to a cleaning range of any of the floor cleaning robots and will not be cleaned at all. Further, as illustrated in FIG. 8, areas of respective regions as divided are not the same; in such case, given that each of the floor cleaning robots has the same cleaning capability, then the cleanliness level of respective cleaning regions cleaned by the floor cleaning robot 1 and the floor cleaning robot 2 will certainly be higher than the cleanliness level of the cleaning region 3 cleaned by the floor cleaning robot 3, within a same time duration.

Figure 9:
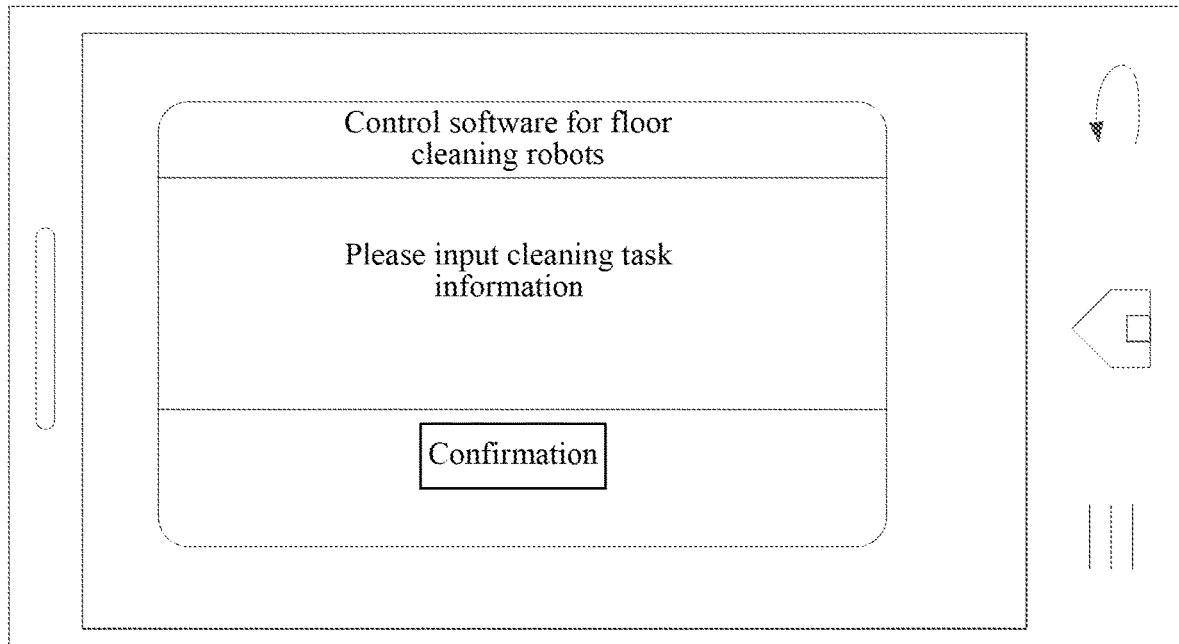
FIG. 9 is a block diagram of a display interface of control software of floor cleaning robots in a terminal device according to a seventh exemplary aspect of the present disclosure.

FIG. 9 is a block diagram of a display interface of the control software for floor cleaning robots in a terminal device according to a seventh exemplary aspect. As illustrated in FIG. 9, proceeding with the steps in the above aspect, the display interface of the control software for floor cleaning robots in the terminal deice contains a prompt message "please input cleaning task information" and a confirmation button.

At this moment, the user can manually input the cleaning task information for the cleaning task he/she intends to perform, and then clicks on the confirmation button. When the control software for floor cleaning robots obtains the cleaning task information, it can determine cleaning control information for each of the floor cleaning robots according to the cleaning task information. The cleaning task information includes cleaning task types and specific parameters corresponding to each of the cleaning task types: and the cleaning task types include any one of a cleaning path, a cleaning region, a cleanliness level after cleaning, and a cleaning time duration, without particularly defined in the present disclosure. When the user finishes inputting, he/she can click on the confirmation button to submit the cleaning task information as input; then the control software for floor cleaning robots analyzes and dissects the cleaning task information submitted by the user according to the cleaning task information in conjunction with preset methods, so as to determine cleaning control information corresponding to each of the floor cleaning robots.

Figure 10:
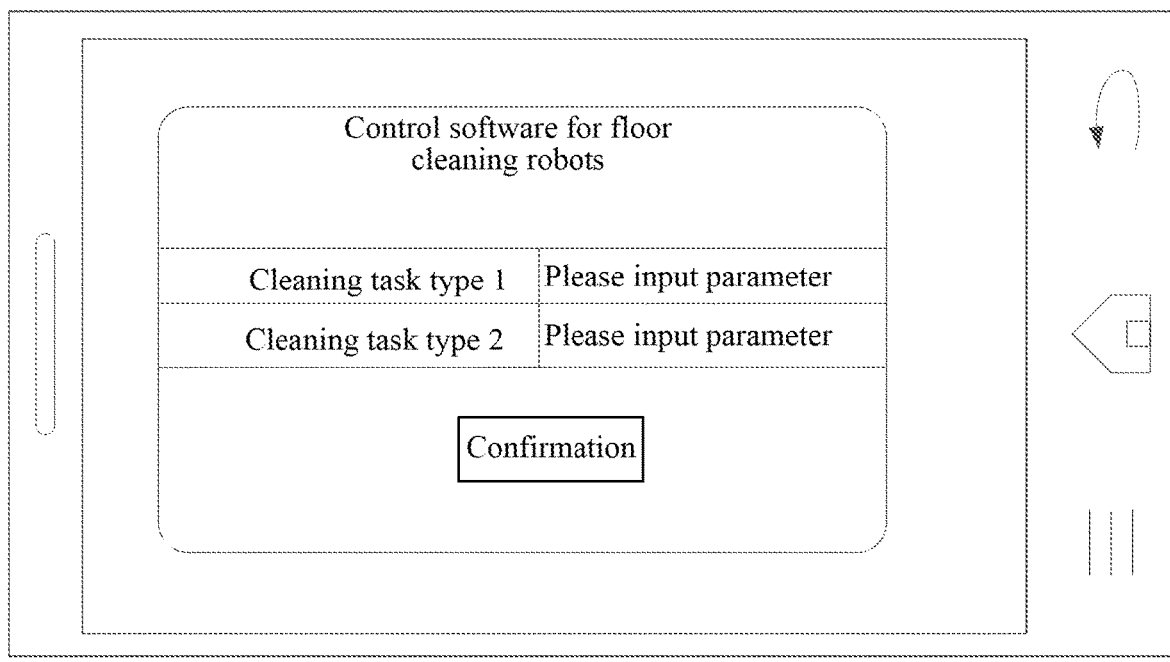
FIG. 10 is a block diagram of a display interface of control software of floor cleaning robots in a terminal device according to an eighth exemplary aspect of the present disclosure.

However, by using such method, the user is required to manually input the cleaning task types and parameter(s) corresponding to each of the cleaning task types in the cleaning task information. Due to the large amount of contents need to be input, the user experience will be relatively poor. FIG. 10 is a block diagram of a display interface of the control software for floor cleaning robots in a terminal device according to an eighth exemplary aspect. As illustrated in FIG. 10, on the basis of FIG. 9, the display interface of the control software for floor cleaning robots in the terminal device includes: each of the cleaning task types (cleaning task type 1 and cleaning task type 2), a prompt message (please input parameter) that prompts the user to input parameter(s) corresponding to each of the cleaning task types, and a confirmation button. At this moment, the user can manually input specific parameter(s) of the cleaning task type at the location of the prompt message "please input parameter". When the user finishes inputting, he/she can click on the confirmation button to submit the cleaning task information as input; and then the control software for floor cleaning robots analyzes and dissects the cleaning task information submitted by the user according to the cleaning task information in conjunction with preset methods, so as to determine cleaning control information corresponding to each of the floor cleaning robots.

By way of the above method, the user is only required to input specific parameter(s) corresponding to the cleaning task type without the need of inputting the cleaning task type. It should be noted that, in such case, the cleaning task types can cover all cleaning task types of the floor cleaning roots; if parameter(s) corresponding to a certain cleaning task type is not input, then it defaults to a preset parameter, or it doesn't perform this cleaning task type, which is not particularly limited herein. More intelligently, if the cleaning task type displayed by the control software for floor cleaning robots cannot satisfy the user's requirements, then the user can further manually input desired cleaning task type(s).

Figure 11:
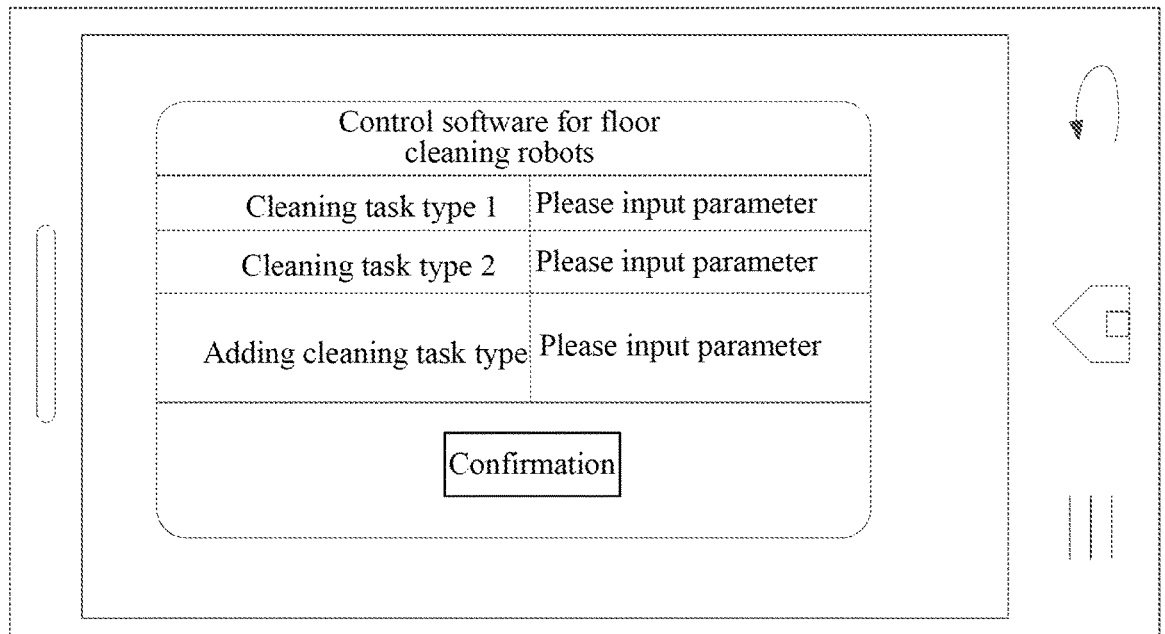
FIG. 11 is a block diagram of a display interface of control software of floor cleaning robots in a terminal device according to a ninth exemplary aspect of the present disclosure.

FIG. 11 is a block diagram of a display interface for the control software of floor cleaning robots in a terminal device according to a ninth exemplary aspect. As illustrated in FIG. 11, on the basis of FIG. 10, an option of "adding cleaning task type" is added to the cleaning task type. When the user needs to manually input the cleaning task type, he/she can manually input the desired cleaning task type at the location of the prompt message "adding cleaning task type", and then manually input parameter(s) corresponding to this cleaning task type at a next location corresponding to "please input parameter". After finishes inputting, the user can click on the confirmation button to submit the cleaning task information as input; and then the control software for floor cleaning robots analyzes and dissects the cleaning task information submitted by the user, according to the cleaning task information in conjunction with preset methods, so as to determine cleaning control information corresponding to each of the floor cleaning robots.

Figure 12:
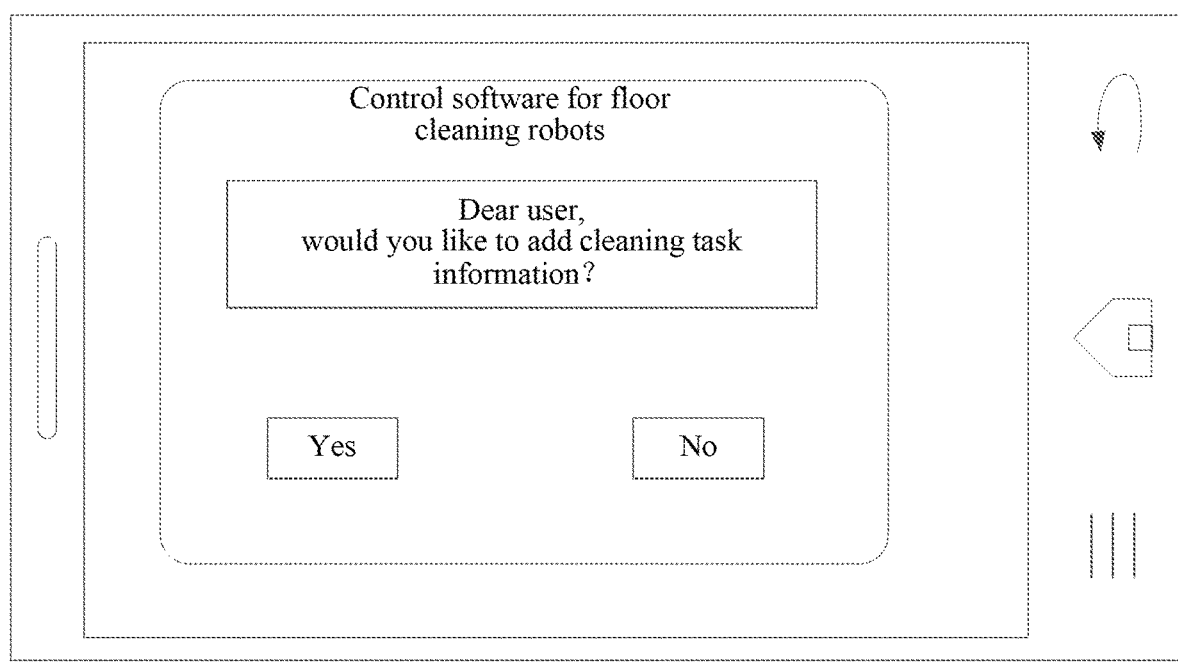
FIG. 12 is a block diagram of a display interface of control software of floor cleaning robots in a terminal device according to a tenth exemplary aspect of the present disclosure.
Figure 13:
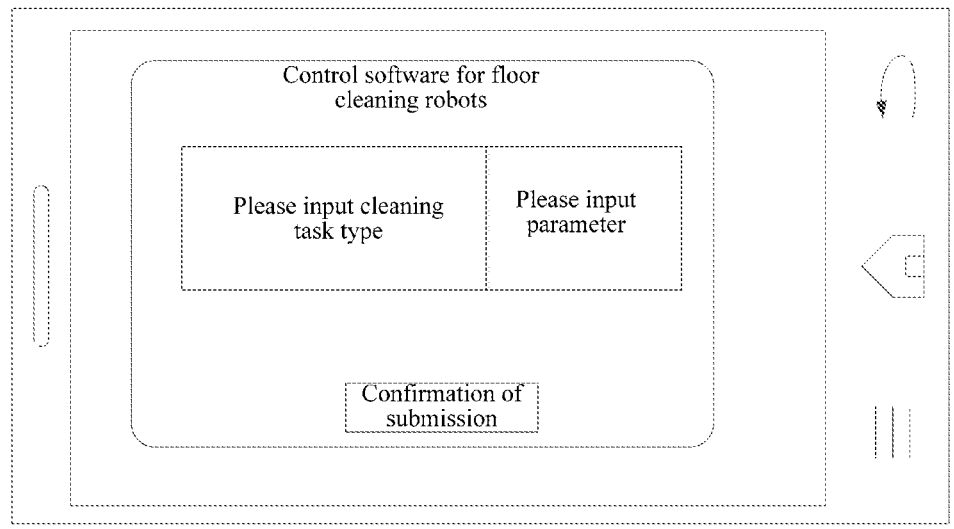
FIG. 13 is a block diagram of a display interface of control software of floor cleaning robots in a terminal device according to an eleventh exemplary aspect of the present disclosure.

FIG. 12 is a block diagram of a display interface of the control software for floor cleaning robots in a terminal device according to a tenth exemplary aspect, and FIG. 13 is a block diagram of a display interface of the control software for floor cleaning robots in a terminal device according to an eleventh exemplary aspect. As illustrated in FIG. 12, on the basis of FIG. 11, after the user clicks on the confirmation button to submit the cleaning task information, the display interface of the control software for floor cleaning robots can further display a prompt message "Dear user, would you like to add cleaning task information?" and buttons indicating "yes" and "no". If the user would like to add cleaning task information, then he/she can click on the button indicating "yes". At this moment, the display interface of the control software for floor cleaning robots displays an interface as illustrated in FIG. 13, and the user is only required to input desired cleaning task type at the location of "please input cleaning task type" and input corresponding parameter(s) at the location of "please input parameter". After the user finishes inputting, he/she can click on the button of confirmation of submission, and then the control software for floor cleaning robots in the terminal device transmits the cleaning control information for each of the floor cleaning robots input by the user to a corresponding floor cleaning robot. When the user does not want to add cleaning task information any more, he/she can click on the button indicating "no", and then the control software for floor cleaning robots in the terminal device analyzes and dissects the cleaning task information submitted by the user, according to the cleaning task information in conjunction with preset methods, so as to determine cleaning control information corresponding to each of the floor cleaning robots.

Figure 14:
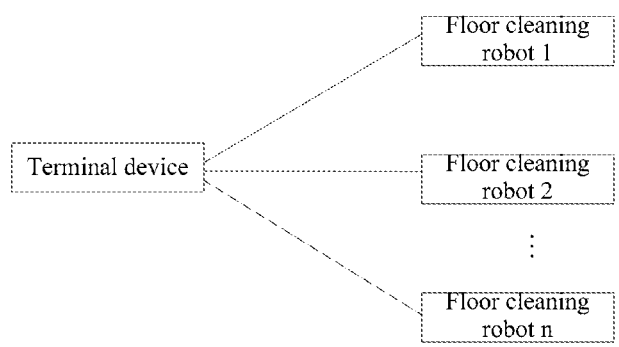
FIG. 14 is a schematic diagram of connection relationships between a terminal device and each of the floor cleaning robots according to a first exemplary aspect of the present disclosure.

Since at least two floor cleaning robots are utilized to cooperatively perform the cleaning task, the interaction between the floor cleaning robots and the terminal device can be achieved by several ways. FIG. 14 is a schematic diagram of connection relationships between a terminal device and each of the floor cleaning robots according to a first exemplary aspect. As illustrated in FIG. 14, in an implementable way, the at least two floor cleaning robots are equal in status, and are both connected to the terminal device. After obtaining the cleaning control information, the terminal device can directly transmit the cleaning control information corresponding to each of the floor cleaning robots to the corresponding floor cleaning robot. It should be noted that, the floor cleaning robots can be connected with the terminal device through wireless communication technology, for example, Bluetooth, Wireless Fidelity (short for Wi-Fi), the 3th Generation mobile communication technology (short for 3G) and the 4th Generation mobile communication technology (short for 4G), etc. In such implementation way, since the terminal device is required to transmit the cleaning control information for each of the floor cleaning robots to the corresponding floor cleaning robot, the reliability of the transmission process is relatively poor, and it's of high possibility that a floor cleaning robot fails to receive the corresponding cleaning control information due to the unreliable connection between the terminal device and the floor cleaning robot.

Figure 15:
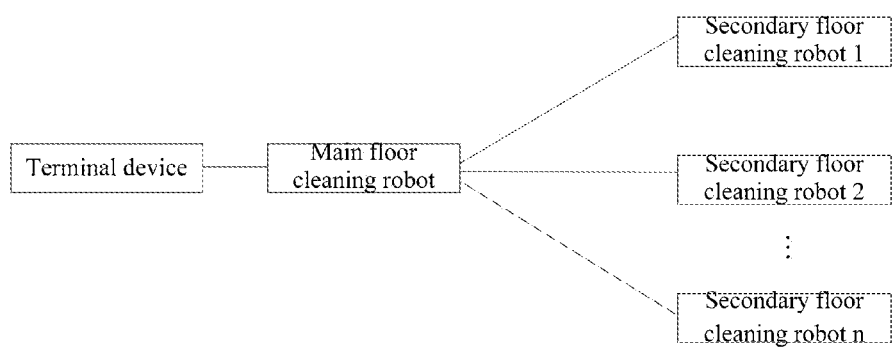
FIG. 15 is a schematic diagram of connection relationships between a terminal device and each of the floor cleaning robots according to a second exemplary aspect of the present disclosure.

FIG. 15 is a schematic diagram of connection relationships between a terminal device and each of the floor cleaning robots according to a second exemplary aspect. As illustrated in FIG. 15, in another implementable way, a main floor cleaning robot can be determined from the at least two floor cleaning robots, so that the other floor cleaning robot(s) is used as secondary floor cleaning robot(s). In such case, the terminal device is only required to be connected to the main floor cleaning robot which is connected to each of the secondary floor cleaning robots. After receiving the cleaning control information, the terminal device is only required to transmit the cleaning control information to the main floor cleaning robot; and then the main floor cleaning robot performs the cleaning task according to one piece of cleaning, control information, and transmits the other cleaning control information in at least two pieces of cleaning control information to at least one secondary floor cleaning robot of at least two floor cleaning robots.

The present aspect provides a method for controlling floor cleaning robots, including: transmitting each of the cleaning task information to a main floor cleaning robot of the at least two floor cleaning robots so that the main floor cleaning robot performs the cleaning task according to one piece of cleaning control information and transmits other cleaning task information in at least two pieces of cleaning control information to at least one secondary floor cleaning robot of at least two floor cleaning robots. Since the terminal device is only connected to the main floor cleaning robot, the reliability of transmitting the cleaning control information is improved.

One of implementable ways of determining the main floor cleaning robot as mentioned above is that: the user pre-configures one of the at least two floor cleaning robots as the main floor cleaning robot and inputs the information to the terminal device.

Another implementable way of determining the main floor cleaning robot as mentioned above is that: prior to performing the method according to the present disclosure, the terminal device is required to perform information interaction with at least two floor cleaning robots so as to determine the main floor cleaning robot and the secondary floor cleaning robot(s). For example, at least two floor cleaning robots can transmit their respective cruising abilities to the terminal device, which then determines the floor cleaning robot having the maximum cruising ability as the main floor cleaning robot and determines the remaining floor cleaning robot(s) as the secondary floor cleaning robot(s).

When the cleaning task information includes cleaning path, the cleaning control information includes cleaning sub-paths.

Figure 16:
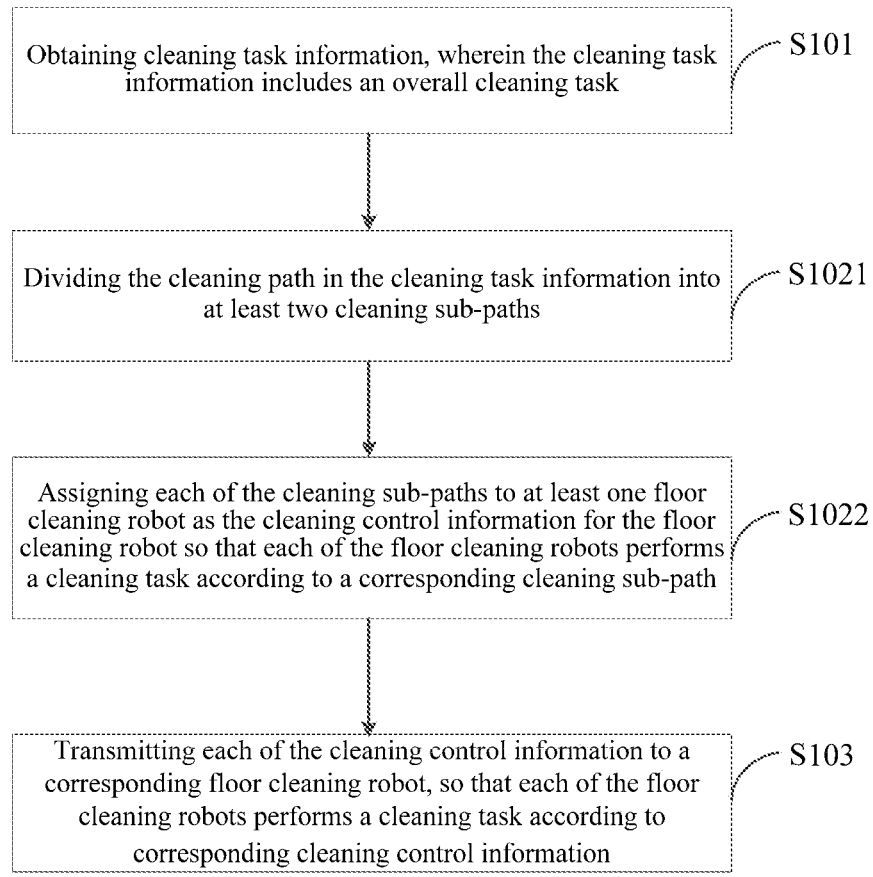
FIG. 16 is a flowchart of an implementation method of step S102 according to a first exemplary aspect of the present disclosure.

In an aspect, as illustrated in FIG. 16, the above step S102 can be implemented as step S1021 and step S1022.

In step S1021, the cleaning path in the cleaning task information is divided into at least two cleaning sub-paths.

In step S1022, each of the cleaning sub-paths is assigned to at least one floor cleaning robot as the cleaning control information for the floor cleaning robot so that each of the floor cleaning robots performs a cleaning task according to a corresponding cleaning sub-path.

Figure 17:
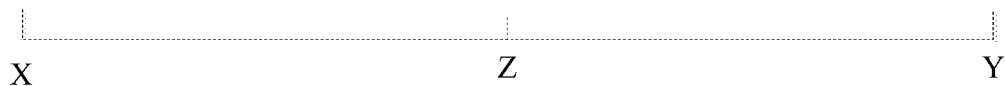
FIG. 17 is a schematic diagram of a division of a cleaning path according to an exemplary aspect of the present disclosure.

For example, the user is provided with two floor cleaning robots which are named as floor cleaning robot A and floor cleaning robot B, respectively. The cleaning task information input by the user is that: the cleaning path is a path of a linear distance between point X and point Y. In one of the implementable ways, as illustrated in FIG. 17, the terminal device divides the cleaning path X-Y as received into two cleaning sub-paths, that is, cleaning sub-path X-Z and cleaning sub-path Z-Y, and assigns the cleaning sub-path X-Z to the floor cleaning robot A and the cleaning sub-path Z-Y to the floor cleaning robot B. Then, the terminal device transmits the dividing results to the floor cleaning robot A and the floor cleaning robot B, respectively, as the cleaning control information. Upon the floor cleaning robot A and the floor cleaning robot B receiving their respective cleaning control information, the floor cleaning robot A performs the cleaning task on the cleaning sub-path X-Z, and the floor cleaning, robot B performs the cleaning task on the cleaning sub-path Z-Y. Since the floor cleaning robot A and the floor cleaning robot B concurrently perform the cleaning task, the cleaning time duration is effectively shortened.

The aspect of the present disclosure provides a method for controlling floor cleaning robots, which divides the cleaning path as obtained into at least two cleaning sub-paths, and then assigns each of the cleaning sub-paths to at least one floor cleaning robot, so that each of the floor cleaning robots performs the cleaning task according to a corresponding cleaning sub-path. Since the cleaning path is cooperatively cleaned by at least two floor cleaning robots, the cleaning time duration is effectively shortened and the cleaning efficiency is improved.

The present aspect provides following two ways of dividing the cleaning path into cleaning sub-paths.

The first way is to equally divide the cleaning path in the cleaning task information into at least two cleaning sub-paths.

The second way is to receive from a user the cleaning path in the cleaning task information, and divide the same into at least two cleaning sub-paths.

In the second way, the user can divide the cleaning path according to his/her requirements, i.e., determining the cleaning sub-path performed by each of the floor cleaning robots.

In another implementable way, it is not necessary to divide the cleaning path. In such case, the cleaning control information as determined by the terminal device is that: the floor cleaning robot A performs a cleaning task from end X to end Y, and the floor cleaning robot B performs a cleaning task from end Y to end X. Such cleaning control information is then transmitted to the floor cleaning robot A and the floor cleaning robot B, respectively. When the floor cleaning robot A and the floor cleaning robot B receive the respective cleaning control information, the floor cleaning robot A performs a cleaning task from end X to end Y, and the floor cleaning robot B performs a cleaning task from end Y to end X. Upon the floor cleaning robot A and the floor cleaning robot B being encountered with each other, the cleaning task is completed, thereby effectively saving the cleaning time.

In an implementable way, the terminal device can obtain a map of a site where the floor cleaning robots are performing cleaning tasks, as a first choice, so that the user can determine the cleaning path in the present cleaning task according to the map. Referring to FIG. 10, by way of example, given that the cleaning task type 1 is just the cleaning path, when the user touches a region where the cleaning task type 1 is located by finger(s), the display screen of the terminal device will pop-up the above-mentioned map; and at this time, the user can mark out a trace of the cleaning path (the cleaning path can be a straight line, or a curved line) with finger(s) so that the terminal device can obtain the cleaning path. One of implementable way for the terminal device to obtain the cleaning path is that: the display interface of the terminal device will display a confirmation button, and the user clicks on the confirmation button after marking out the trace of the cleaning path with finger(s); and then the terminal device can obtain the cleaning path.

When the cleaning task information includes cleaning region, the cleaning control information includes cleaning sub-regions.

Figure 18:
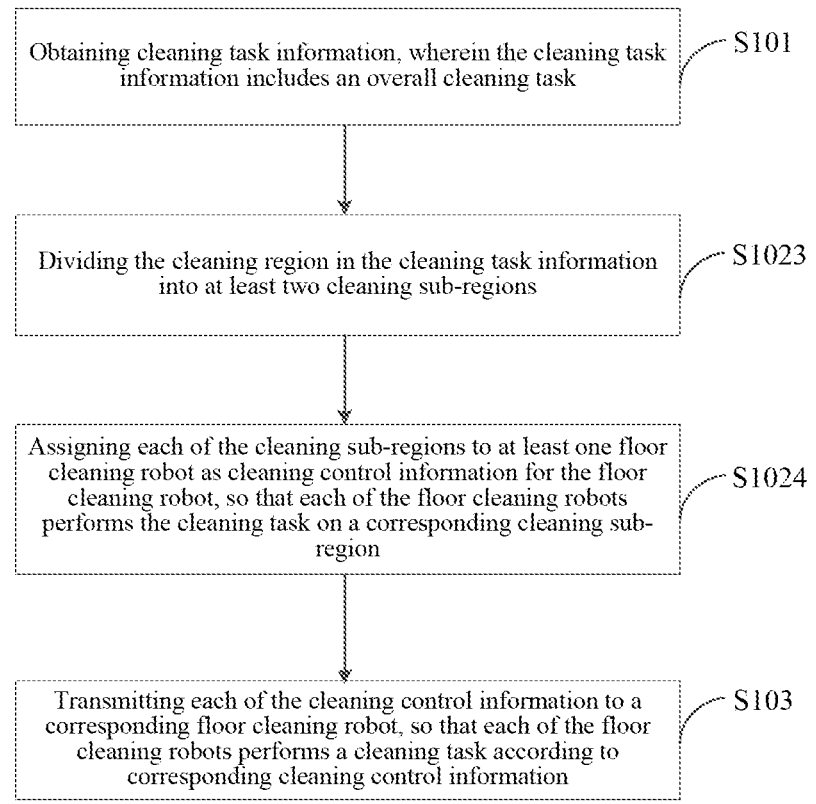
FIG. 18 is a flowchart of an implementation method of step S102 according to a second exemplary aspect of the present disclosure.

In an aspect, as illustrated in FIG. 18, the above step S102 can be implemented as steps 1023-1024.

In step S1023, the cleaning region in the cleaning task information is divided into at least two cleaning sub-regions.

In Step 1024, each of the cleaning sub-regions is assigned to at least one floor cleaning robot as cleaning control information for the floor cleaning robot, so that each of the floor cleaning robots performs the cleaning task on a corresponding cleaning sub-region.

The terminal device can obtain a map of a site where the floor cleaning robots are performing cleaning tasks, as a first choice, so that the user can determine the cleaning region in the present cleaning task according to the map. One of implementable ways of determining the cleaning region can include: the user marks out an edge trace of the cleaning region on the map displayed by the terminal device, so that the terminal device can determine a region enclosed by the edge trace as the cleaning region. Referring to FIG. 10, by way of example, given that the cleaning task type 1 is just the cleaning region, when the user touches a region where the cleaning task type 1 is located by finger(s), the display screen of the terminal device will pop-up the above-mentioned map; and at this moment, the user can mark out the edge trace of the cleaning path manually, and the terminal device can obtain the cleaning region upon obtaining the edge trace. One of implementable way for the terminal device to obtain the edge trace is that: the display interface of the terminal device will display a confirmation button, and the user can click on the confirmation button after marking out the edge trace of the cleaning region; and then the terminal device can obtain the edge trace.

One implementable way of obtaining the map is that: the floor cleaning robot obtains a cleaning map according to previous historical cleaning records and transmits the map to the terminal device. Another implementable way is that: the user pre-stores the map in the terminal device.

Figure 19:
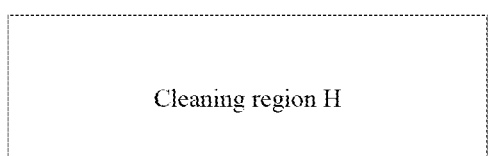
FIG. 19 is a schematic diagram of a cleaning region according to an exemplary aspect of the present disclosure.
Figure 20:
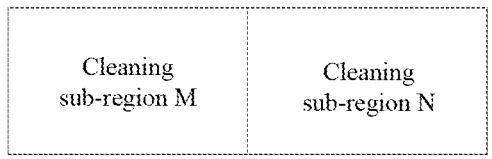
FIG. 20 is a schematic diagram of division of a cleaning area according to an exemplary aspect of the present disclosure.

By way of example, the user owns two floor cleaning robots named as floor cleaning robot A and floor cleaning robot B, respectively, as illustrated in FIG. 19. The user marks out a cleaning region H in which the present cleaning task is performed, as illustrated in FIG. 20. Upon obtaining the cleaning region H, the terminal device divides the cleaning region H into a cleaning sub-region N and a cleaning sub-region M, assigns the cleaning sub-region N to the floor cleaning robot A and assigns the cleaning sub-region M to the floor cleaning robot B, and transmits the assigning results to the floor cleaning robot A and the floor cleaning robot A, respectively, as the cleaning control information. Upon the floor cleaning robot A and the floor cleaning robot B receiving their respective cleaning control information, the floor cleaning robot A performs the cleaning task on the cleaning sub-region N and the floor cleaning robot B performs the cleaning task on the cleaning sub-region M. Since the floor cleaning robot A and the floor cleaning robot B concurrently performs the cleaning task, the cleaning time is effectively saved.

The aspect of the present disclosure provides two ways of dividing the cleaning region into cleaning sub-regions.

The first way is to equally divide the cleaning region in the cleaning task information into at least two cleaning sub-regions.

The second way is to receive from a user the cleaning path in the cleaning task information, which is divided into at least two cleaning sub-regions.

In the second way, the user can divide the cleaning region according to his/her requirements, i.e., determining the cleaning sub-region performed by each of the floor cleaning robots, which is quite flexible.

The aspect of the present disclosure provides a method for controlling floor cleaning robots, which divides the cleaning region as obtained into at least two cleaning sub-regions, and assigns each of the cleaning sub-regions to at least one floor cleaning robot, so that each of the floor cleaning robots cleans a corresponding cleaning sub-region. Since at least two floor cleaning robots are utilized to cooperatively clean the cleaning region, the cleaning time duration is effectively shortened and the cleaning efficiency is improved.

When the cleaning task information includes a cleanliness level after cleaning, the cleaning control information includes a cleaning mode and a cleaning start time.

Figure 21:
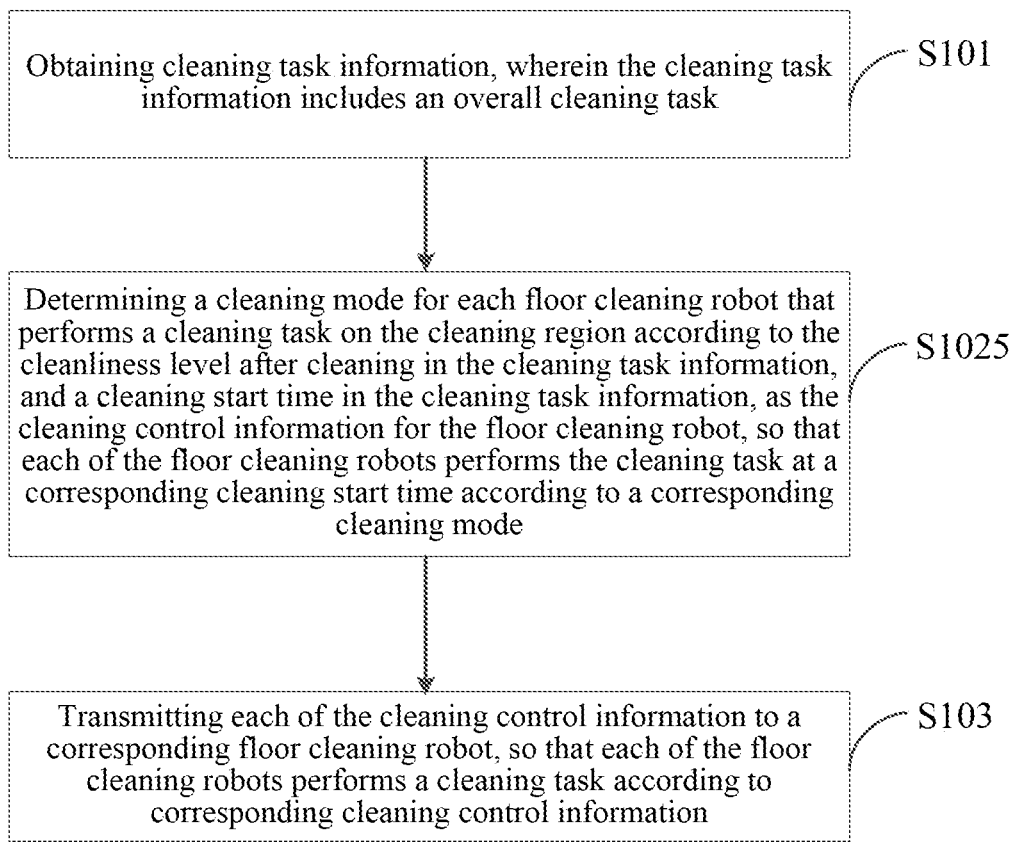
FIG. 21 is a flowchart of an implementation method of step S102 according to a third exemplary aspect of the present disclosure.

In an aspect, as illustrated in FIG. 21, the above step S102 can be implemented as step S1025.

In step S1025, determining a cleaning mode for each floor cleaning robot that performs a cleaning task on the cleaning region according to the cleanliness level after cleaning in the cleaning task information, and a cleaning start time in the cleaning task information, as the cleaning control information for the floor cleaning robot, so that each of the floor cleaning robots performs the cleaning task at a corresponding cleaning start time according to a corresponding cleaning mode.

By way of example, the user owns two floor cleaning robots named as floor cleaning robot A and floor cleaning robot B. When the cleanliness level of the cleaning region is relatively lower, that is, when the cleaning region is dirty, it is possible to firstly instruct the floor cleaning robot A to perform one time of cleaning task according to a cleaning mode of "mild cleaning", and then instruct the floor cleaning robot B to perform another time of cleaning task according to a cleaning mode of "deep cleaning", so that the cleanliness level of the cleaning region upon cleaning can reach a clean level expected by the user. In order to shorten the cleaning time duration, it's possible to instruct the floor cleaning robot B to perform the cleaning task by following the floor cleaning robot A, that is, the cleaning start time of the floor cleaning robot B is later than the cleaning start time of the floor cleaning robot A. For example, the cleaning start time of the floor cleaning robot B is 5:30, while the cleaning start time of the floor cleaning robot A is 5:29, so that the cleanliness level expected by the user can be achieved while shortening the cleaning time duration.

Referring to FIG. 10, by way of example, given that the cleaning task type 1 is just the cleanliness level after cleaning, when the user touches a region where the cleaning task type 1 is located, a pull-down menu appears, which includes various types of cleanliness levels such as high cleanliness and middle cleanliness. At this moment, the user is only required to click on the desirable cleanliness level, e.g., high cleanliness, and then the terminal device obtains "high cleanliness" as the cleanliness level after cleaning and hence determines the cleaning control information according to the cleanliness level after cleaning.

The aspect of the present disclosure provides a method for controlling floor cleaning robots, including: determining a cleaning mode for each floor cleaning robot that performs a cleaning task on the cleaning region according to the cleanliness level after cleaning in the cleaning task information, and a cleaning start time in the cleaning task information, as the cleaning control information for the floor cleaning robot, so that each of the floor cleaning robots performs a cleaning task at a corresponding cleaning start time according to a corresponding cleaning mode. Since at least two floor cleaning robots are utilized to cooperatively perform cleaning to achieve the cleanliness level after cleaning expected by the user, the cleaning time is effectively saved and the cleaning efficiency is improved.

When the cleaning task information includes a cleaning time duration, in an aspect, the above step S102 can be implemented as: determining a cleaning time duration for at least two floor cleaning robots according to the cleaning time duration in the cleaning task information, in which the cleaning time duration for each of the two floor cleaning robots equals to the cleaning time duration in the cleaning task information, so that each of the floor cleaning robots performs the cleaning task within the cleaning tinge duration of the floor cleaning robot.

By way of example, the cleaning time duration contained in the cleaning task information is 30 min, then the cleaning, time duration of each of the floor cleaning robots is just 30 min, and the cleaning task of each of the floor cleaning robot will be ended upon being performed for 30 min.

The aspect of the present disclosure provides a method for controlling floor cleaning robots, which restricts the cleaning time duration for each of the floor cleaning robots so that the floor cleaning robot can perform the cleaning task within the cleaning time duration in such a manner that the cleaning task is stopped at the end of the cleaning time duration, thereby effectively saving the power consumption of the floor cleaning robot.

In other implementable ways, the above-mentioned various types of cleaning task information can be combined. For example, the cleaning task information can include cleanliness level after cleaning and cleaning time duration, and the cleaning control information includes cleaning mode and cleaning start time.

Figure 22:
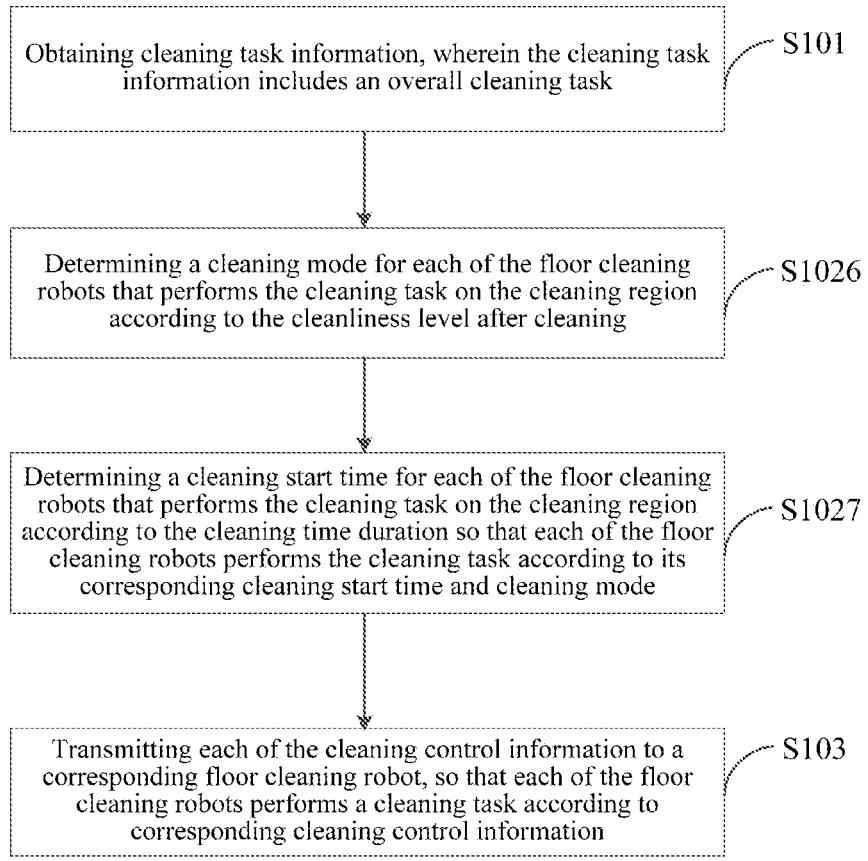
FIG. 22 is a flowchart of an implementation method of step S102 according to a fourth exemplary aspect of the present disclosure.

Here, as illustrated in FIG. 22, the above step S102 can be implemented as steps S1026-S1027.

In step S1026, a cleaning mode for each of the floor cleaning robots that performs the cleaning task on the cleaning region is determined according to the cleanliness level after cleaning.

In step S1027, a cleaning start time of each of the floor cleaning robots that performs the cleaning task on the cleaning region is determined according to the cleaning time duration so that each of the floor cleaning robots performs the cleaning task according to its corresponding cleaning start time and cleaning mode.

Figure 23:
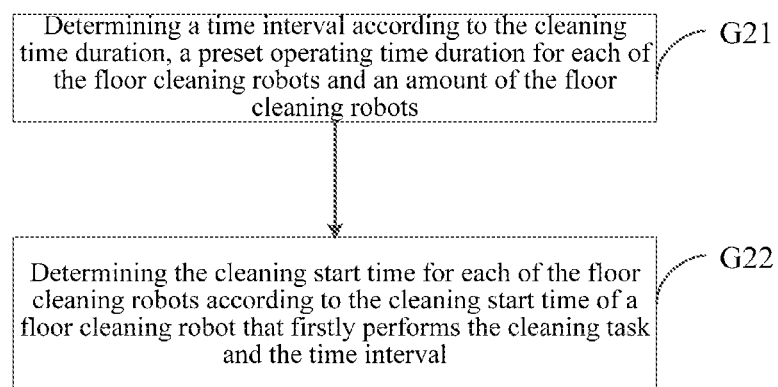
FIG. 23 is a flow diagram of an implementation of step 1027 according to an exemplary aspect of the present disclosure.

In an aspect, as illustrated in FIG. 23, the above step S1027 can be implemented as step G21 and step G22.

In step G21, a time interval is determined according to the cleaning time duration, a preset operating time duration for each of the floor cleaning robots and the number of the floor cleaning robots.

In step G22, the cleaning start time of each of the floor cleaning robots is determined according to the cleaning start time of a floor cleaning robot that firstly performs the cleaning task and the time interval.

One of implementable ways of the above steps G21 and G22 is described as below.

The time interval is determined based on $$\Delta t = \frac{T - t}{a - 1},$$

wherein $\Delta t$ is the time interval, T is the cleaning time duration, t is a preset operating time duration of each of the floor cleaning robots, and, a is the number of the floor cleaning robots.

The cleaning start time of each of the floor cleaning robots is determined based on $t_1 = t_1 + \Delta t \times (i-1)$, wherein $t_1$ is the cleaning start time of a $i^{th}$ floor cleaning robot, i is a positive integer equal to or greater than 2, $t_1$ is the cleaning start time of a first floor cleaning robot, and $\Delta t$ is the time interval.

Figure 24:
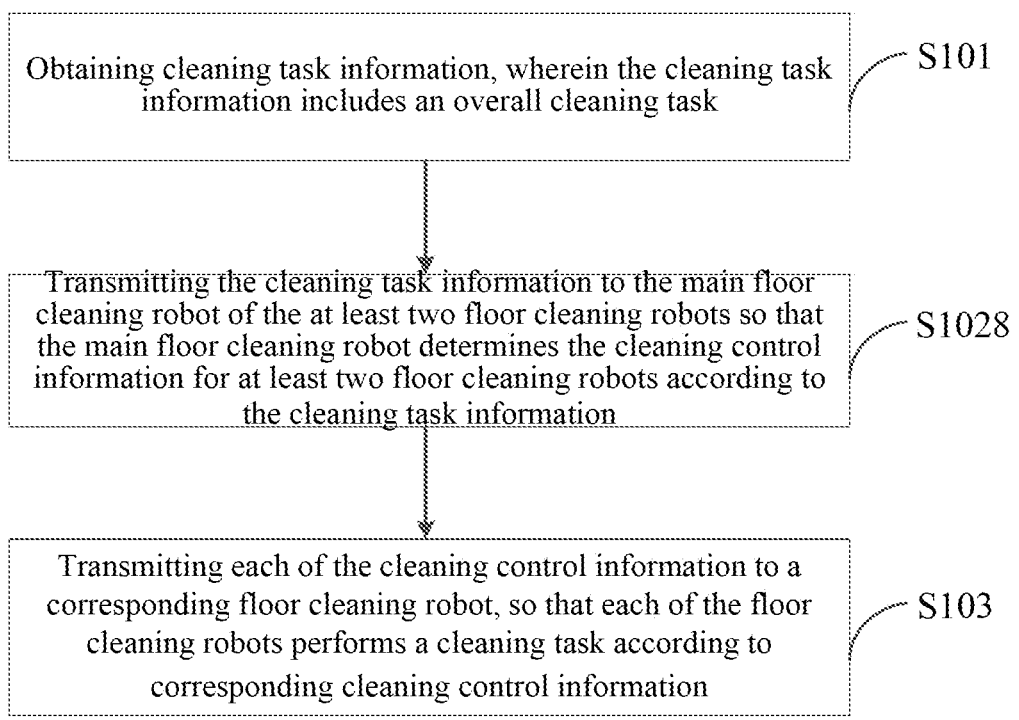
FIG. 24 is a flowchart of an implementation method of step S102 according to a fifth exemplary aspect of the present disclosure.

It should be noted that, in an aspect, as illustrated in FIG. 24, the above step S102 can also be implemented as step S1028.

In step S1028, transmitting the cleaning task information to the main floor cleaning robot of the at least two floor cleaning robots so that the main floor cleaning robot determines the cleaning control information for at least two floor cleaning robots according to the cleaning task information. The way for the main floor cleaning robot to determine the cleaning control information for at least two floor cleaning robots according to the cleaning task information is the same with the above-mentioned way for the terminal device to determine the cleaning control information for at least two floor cleaning robots according to the cleaning task information, and the details thereof will not be repeated here. In an implementable way, during the main floor cleaning robot determining the cleaning control information, one piece of cleaning control information is to be assigned to the main floor cleaning robot itself.

Further, in the foregoing aspects, all the actions performed by the terminal device and the information processed by the terminal device can be completed by the main floor cleaning robot. For purpose of clearly explaining the operating process only, the foregoing is described with reference to the terminal device by way of example.

Figure 25:
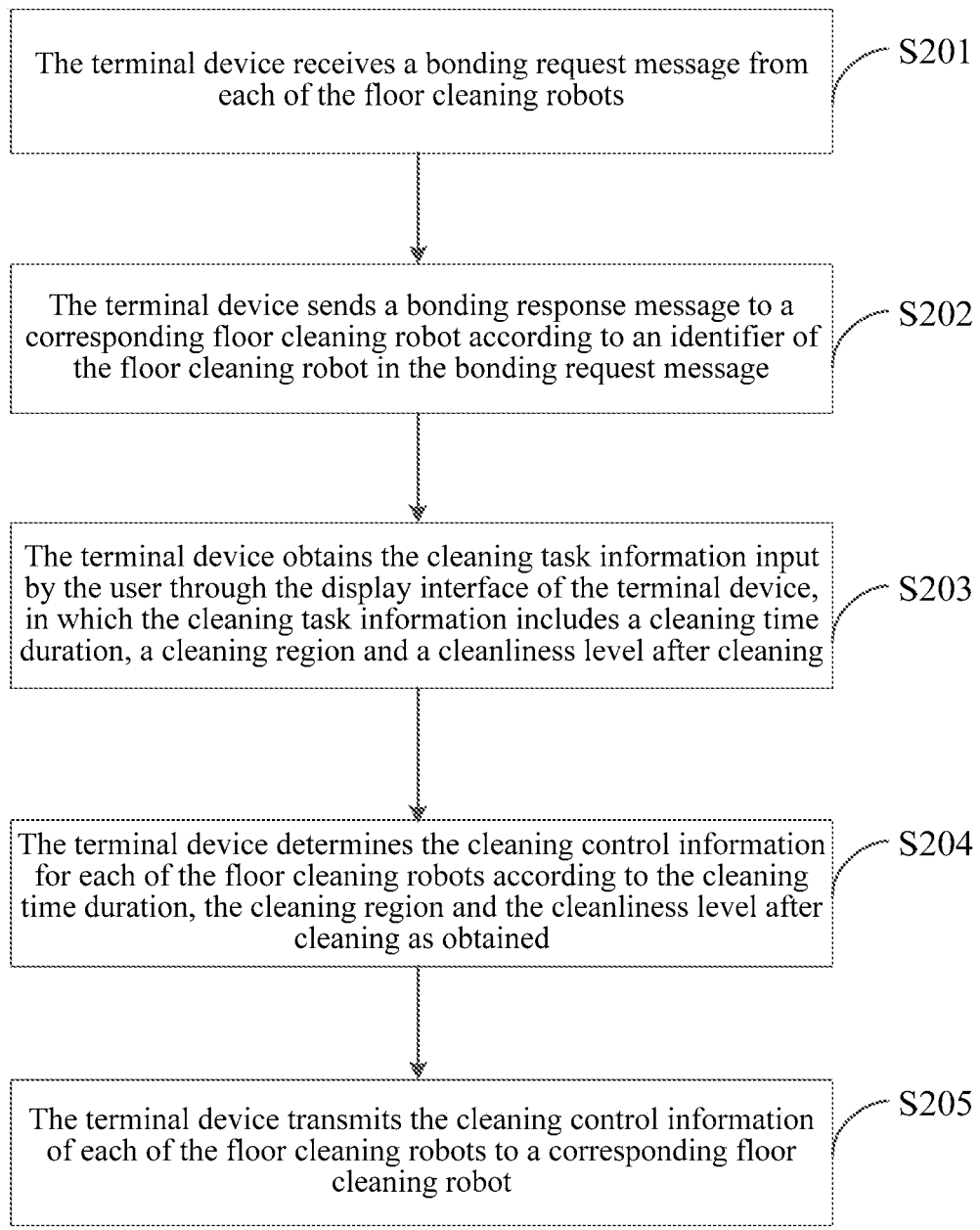
FIG. 25 is a flow diagram of a method for controlling floor cleaning robots according to a second exemplary aspect of the present disclosure.

FIG. 25 is a flow diagram of a method for controlling floor cleaning robots according to a second exemplary aspect. In the present aspect, for more clear description of the technical solutions of the present disclosure, the method is described with reference to the terminal device by way of example. As illustrated in FIG. 25, the method for controlling floor cleaning robots can include the following steps S201-S205.

In step S201, the terminal device receives a bonding request message from each of the floor cleaning robots, in which an identifier of each of the floor cleaning robots is carried with.

In step S202, the terminal device sends a bonding response message to a corresponding floor cleaning robot according to the identifier of floor cleaning robot in the bonding request message.

By the above steps S201 and S202, a communication link between the terminal device and each of the floor cleaning robots is established so that: during later period, the terminal device can transmit the cleaning control information as determined for each of the floor cleaning robots to a corresponding floor cleaning robot through the communication link established for the corresponding floor cleaning robot.

In step S203, the terminal device obtains the cleaning task information input by the user through the display interface of the terminal device, in which the cleaning task information includes a cleaning time duration, a cleaning region and a cleanliness level after cleaning.

For example, the cleaning time duration is 20 min, and the cleanliness level after cleaning is high cleanliness.

In step S204, the terminal device determines the cleaning control information for each of the floor cleaning robots according to the cleaning tinge duration, the cleaning region and the cleanliness level after cleaning as obtained.

Proceeding with the above-mentioned examples and given that three floor cleaning robots (i.e., floor cleaning robot A, floor cleaning robot B and floor cleaning robot C) cooperatively perform the cleaning task, then the terminal device equally divides the above cleaning region into three sub-regions which are cleaning sub-region a, cleaning sub-region b and cleaning sub-region c, respectively, and transmits the cleaning sub-region a to the floor cleaning robot A, transmits the cleaning sub-region b to the floor cleaning robot B, and transmits the cleaning sub-region c to the floor cleaning robot C. According to the high cleanliness level after cleaning, the terminal device determines that only each of the floor cleaning robots performs a deep cleaning can achieve such cleanliness level. At this moment, the terminal device determines that the cleaning mode for each of the floor cleaning robots is a deep cleaning. With this, the cleaning control information determined by the terminal device for the floor cleaning robot A is that: the cleaning time duration is 10 min, the cleaning region is cleaning sub-region a, and the cleaning mode is deep cleaning; the cleaning control information determined by the terminal device for the floor cleaning robot B is that: the cleaning time duration is 10 min, the cleaning region is cleaning sub-region b, and the cleaning mode is deep cleaning; the cleaning control information determined by the terminal device for the floor cleaning robot C is that: the cleaning time duration is 10 min, the cleaning region is cleaning sub-region c, and the cleaning mode is deep cleaning.

In step S205, the terminal device transmits the cleaning control information of each of the floor cleaning robots to a corresponding floor cleaning robot so that the floor cleaning robot performs a cleaning task according to the cleaning control information upon receiving the cleaning control information.

Proceeding with the above-mentioned examples, the terminal device transmits the cleaning control information for the floor cleaning robot A to the floor cleaning robot A, transmits the cleaning control information for the floor cleaning robot B to the floor cleaning robot B, and transmits the cleaning control information for the floor cleaning robot C to the floor cleaning robot C. Since each of the floor cleaning robots may receive its cleaning control information at different times, when the floor cleaning robot A receives the corresponding cleaning control information and detects that the cleaning control information contains no cleaning start time, it adjusts the cleaning mode to deep cleaning in real time, configures its own cleaning time duration as 10 min, and begins performing a deep cleaning on the cleaning sub-region a for 10 min; the operations performed by the floor cleaning robot B and the floor cleaning robot C are similar with that of the floor cleaning robot A, without repeating herein.

The terminal device in the present aspect can also be the main floor cleaning robot described in the foregoing aspects.

The aspect of the present disclosure provides a method for controlling floor cleaning robots, including: each of the floor cleaning robots firstly is bonded with the terminal device; and then the terminal device obtains the cleaning task information input by the user through the display interface of the terminal device, determines the cleaning control information for each of the floor cleaning robots according to the cleaning task information as obtained, and transmits the cleaning control information to the corresponding floor cleaning robots; finally, upon receiving the cleaning control information, the floor cleaning robot performs the cleaning task according to the cleaning control information. By cooperatively performing the cleaning task through several floor cleaning robots, the cleaning efficiency can be effectively improved.

Figure 26:
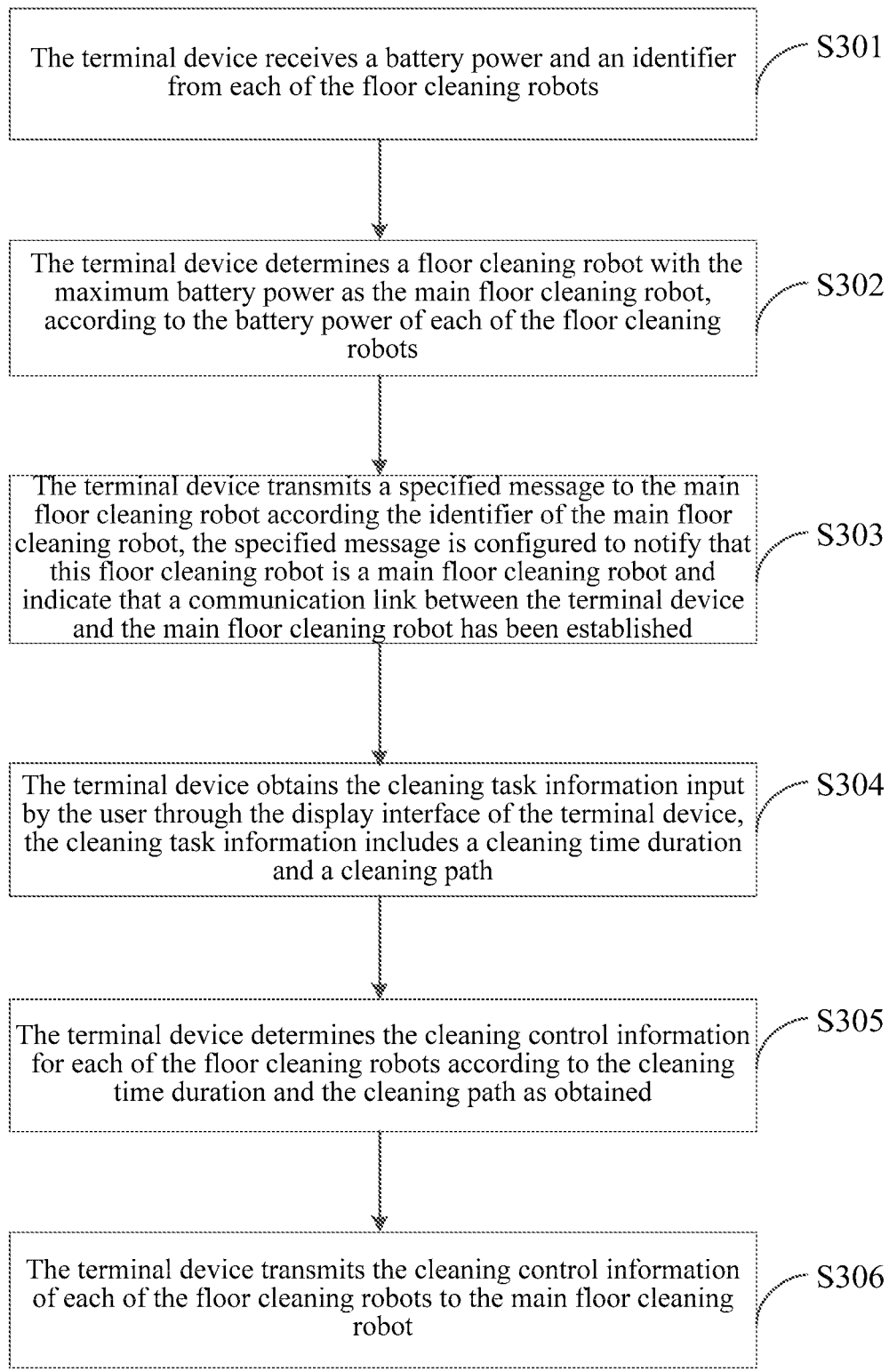
FIG. 26 is a flow chart of a method for controlling floor cleaning robots according to a third exemplary aspect of the present disclosure.

FIG. 26 is a flow chart of a method for controlling floor cleaning, robots according to a third exemplary aspect. In the present aspect, in order for more clear description of the solutions of the present disclosure, the terminal device is described by way of example. As illustrated in FIG. 26, the method for controlling floor cleaning robots includes following steps S301-S306.

In step S301, the terminal device receives a battery power and an identifier from each of the floor cleaning robots.

In step S302 the terminal device determines a floor cleaning robot with the maximum battery power as the main floor cleaning robot, according to the battery power of each of the floor cleaning robots.

By way of example, given that three floor cleaning robots (floor cleaning robot A, floor cleaning robot B and floor cleaning robot C) cooperatively perform the cleaning task and that the floor cleaning robot B has the maximum battery power, then the terminal device determines the floor cleaning robot B as the main floor cleaning robot and determines the floor cleaning robot A and floor cleaning robot C as secondary floor cleaning robots.

In step S303, the terminal device transmits a specified message to the main floor cleaning robot according the identifier of the main floor cleaning robot; the specified message is configured to notify that this floor cleaning robot is a main floor cleaning robot and indicate that a communication link between the terminal device and the main floor cleaning robot has been established.

Upon receiving the specified message, the main floor cleaning robot transmits instruction messages to other floor cleaning robots; the instruction messages are configured to notify that other floor cleaning robots are secondary floor cleaning robots and communication links have to be established. Upon receiving the instruction messages, the secondary floor cleaning robots send response messages to the main floor cleaning robot.

Proceeding with the above-mentioned examples, the terminal device sends a specified message to the floor cleaning robot B. Upon receiving the specified message, the floor cleaning robot B transmits instruction messages to the floor cleaning robot A and the floor cleaning robot C.

With this, the communication link between the main floor cleaning robot and the terminal device, and the communication link between the main floor cleaning robot and each of the secondary floor cleaning robots are established, so that in later period the terminal device can transmit the cleaning control information for each of the floor cleaning robots as determined to the main floor cleaning robot, which then transmits the cleaning control information to each of the secondary floor cleaning robots.

In step S304, the terminal device obtains the cleaning task information input by the user through the display interface of the terminal device, in which the cleaning task information includes cleaning time duration and cleaning path.

For example, the cleaning time duration is 20 min.

In step S305, the terminal device determines the cleaning control information for each of the floor cleaning robots according to the cleaning time duration and the cleaning path as obtained.

Proceeding with the above example, given that the cleaning path has a length of 60 m and the floor cleaning robot has a cleaning rate of 3 m/min then a single floor cleaning robot can just finish one time of cleaning within 20 min, which, however, is not sufficient to clean up. Therefore, it requires each of the floor cleaning robots to perform one time of cleaning on this cleaning path; in such case, since three floor cleaning robots are provided, the cleaning path can be cleaned for three times to achieve the purpose of cleaning up. Based on this, it requires to determine a cleaning start time for each of the floor cleaning robots so that each of the floor cleaning robots begins to perform the cleaning task only when the corresponding cleaning start time is coming, which avoids crowd and collision of floor cleaning robots. For example, when the terminal device determines that the cleaning start time of the floor cleaning robot A is 4:30, it determines the cleaning start time of the floor cleaning robot B as 4:35 and determines the cleaning start time of the floor cleaning robot C as 4:40, in order to save the total cleaning time duration. With this, the cleaning control information determined by the terminal device for the floor cleaning robot A includes: the cleaning time duration is 20 min, the cleaning start time is 4:30, and the cleaning path; the cleaning control information determined by the terminal device for the floor cleaning robot B includes: the cleaning time duration is 20 min, the cleaning start time is 4:35, and the cleaning path; the cleaning control information determined by the terminal device for the floor cleaning robot C includes: the cleaning time duration is 20 min, the cleaning start time is 4:40, and the cleaning path.

In step S306, the terminal device transmits the cleaning control information of each of the floor cleaning robots to the main floor cleaning robot.

Upon receiving the cleaning control information, the main floor cleaning robot transmits the cleaning control information of each of the secondary floor cleaning robots to the corresponding floor cleaning robot so that each of the floor cleaning robots performs the cleaning task according to its corresponding cleaning control information.

Proceeding with the above example, the terminal device transmits all of the cleaning control information of the floor cleaning robot A, the cleaning control information of the floor cleaning robot B and the cleaning control information of the floor cleaning robot C to the floor cleaning robot B. Upon receiving the cleaning control information of all the floor cleaning robots, the floor cleaning robot B transmits the cleaning control information corresponding to the floor cleaning robot A to the floor cleaning robot A, and transmits the cleaning control information corresponding to the floor cleaning robot C to the floor cleaning robot C.

Upon the floor cleaning robot B obtaining its own cleaning control information, since the cleaning control information contains cleaning path and cleaning start time, the floor cleaning robot A is required to move to a starting point of the cleaning path and begins to perform the cleaning task for 20 min from 4:30; the operating process of the floor cleaning robot B and the floor cleaning robot C are similar with that of the floor cleaning robot A, without repeating herein.

The aspect of the present disclosure provides a method for controlling floor cleaning robots, including: firstly, determining the main floor cleaning robot and the secondary floor cleaning robot(s) from the floor cleaning robots, and only interacting with the main floor cleaning robot by the terminal device; that is to say, the terminal device directly transmits all the cleaning task information determined for the floor cleaning robots to the main floor cleaning robot, which then transmits the cleaning task information to the corresponding secondary floor cleaning robot(s) respectively; finally, all the floor cleaning robots cooperatively perform the cleaning task according to the respective cleaning control information as received. Since the terminal device interacts with the main floor cleaning robot only, the reliability of information transmission is improved. Moreover, several floor cleaning robots cooperatively performing the cleaning task can effectively improve the cleaning efficiency.

Figure 27:
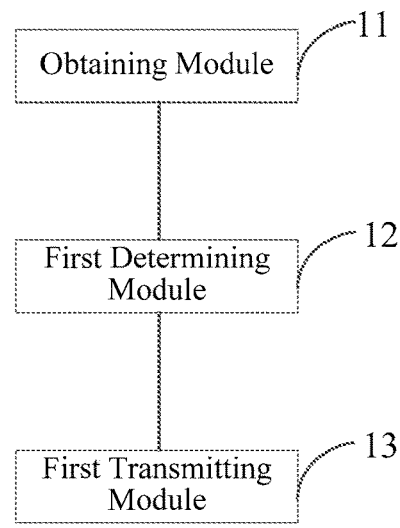
FIG. 27 is a block diagram of a device for controlling floor cleaning robots according to a first exemplary aspect of the present disclosure.

FIG. 27 is a block diagram of a device for controlling floor cleaning robots according to a first exemplary aspect. Referring to FIG. 27, the device includes:

An obtaining module 11 configured to obtain cleaning task information, in which the cleaning task information includes an overall cleaning task;

A first determining module 12 configured to determine cleaning control information for at least two floor cleaning robots according to the cleaning task information, in which the cleaning control information includes control information for each of the floor cleaning robots;

A first transmitting module 13 configured to transmit each of the cleaning control information to a corresponding floor cleaning robot, so that each of the floor cleaning robots performs the cleaning task according to the corresponding cleaning control information.

Figure 28:
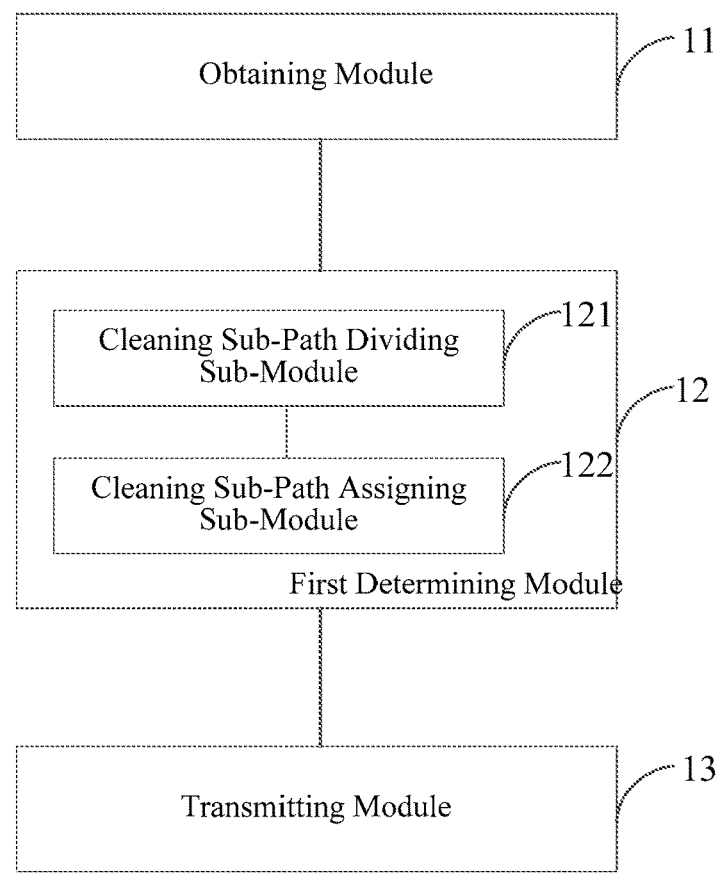
FIG. 28 is a block diagram of a first determination module 12 in a device for controlling floor cleaning robots according to a first exemplary aspect of the present disclosure.

In an aspect, as illustrated in FIG. 28, when the cleaning task information includes a cleaning path, the cleaning control information includes cleaning sub-paths.

The first determining module 12 includes a cleaning sub-path dividing sub-module 121 and a cleaning sub-path assigning sub-module 122.

The cleaning sub-path dividing sub-module 121 is configured to divide the cleaning path in the cleaning task information into at least two cleaning sub-paths.

The cleaning sub-path assigning sub-module 122 is configured to assign each of the cleaning sub-paths determined by the cleaning sub-path dividing sub-module 121 to at least one floor cleaning robot as cleaning control information for the floor cleaning robot, so that each of the floor cleaning robots performs a cleaning task according to a corresponding cleaning sub-path.

Figure 29:
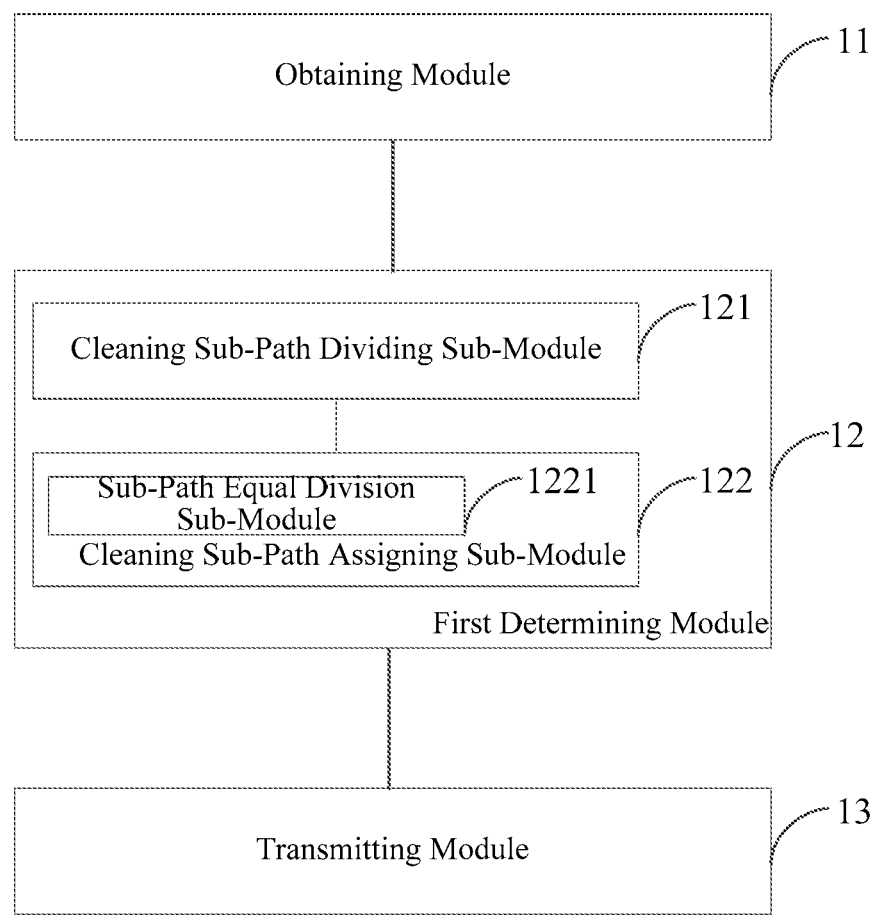
FIG. 29 is a block diagram of a cleaning sub-path dividing sub-module 122 in a device for controlling floor cleaning robots according to a first exemplary aspect of the present disclosure.

In an aspect, as illustrated in FIG. 29, the cleaning sub-path dividing module 122 includes: a sub-path equal division sub-module 1221.

The sub-path equal division sub-module 1221 is configured to equally divide the cleaning path in the cleaning task information into at least two of the cleaning sub-paths.

Figure 30:
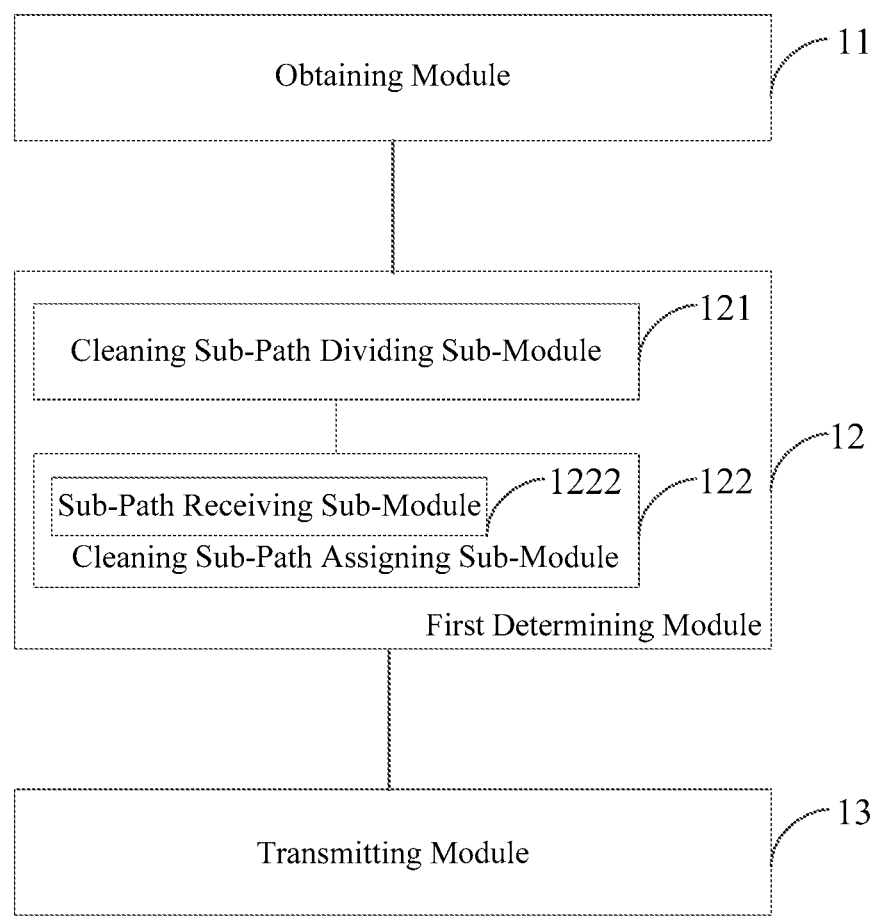
FIG. 30 is a block diagram of a cleaning sub-path dividing sub-module 122 in a device for controlling floor cleaning robots according to a second exemplary aspect of the present disclosure.

In an aspect, as illustrated in FIG. 30, the cleaning sub-path dividing module 122 includes a sub-path receiving sub-module 1222.

The sub-path receiving sub-module 1222 is configured to receive from a user the cleaning path in the cleaning task information, which is divided into at least two cleaning sub-paths.

Figure 31:
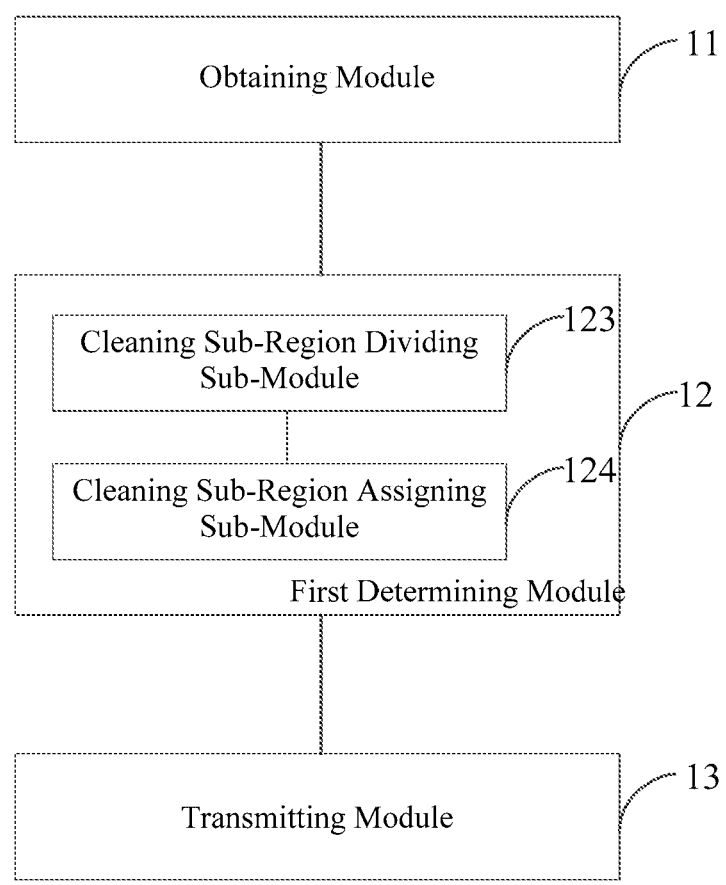
FIG. 31 is a block diagram of a first determination module 12 in a device for controlling floor cleaning robots according to a second exemplary aspect of the present disclosure.

In an aspect, as illustrated in FIG. 31, when the cleaning task information includes a cleaning region, the cleaning control information includes cleaning sub-region.

The first determining module 12 includes a cleaning sub-region dividing sub-module 123 and a cleaning sub-region assigning sub-module 124.

The cleaning sub-region dividing sub-module 123 is configured to divide the cleaning region in the cleaning task information into at least two cleaning sub-regions.

The cleaning sub-region assigning sub-module 124 is configured to assign each of the cleaning sub-regions, determined by the cleaning sub-region dividing sub-module 123, to at least one floor cleaning robot as cleaning control information for the floor cleaning robot, so that each of the floor cleaning robots performs a cleaning task according to its corresponding cleaning sub-region.

Figure 32:
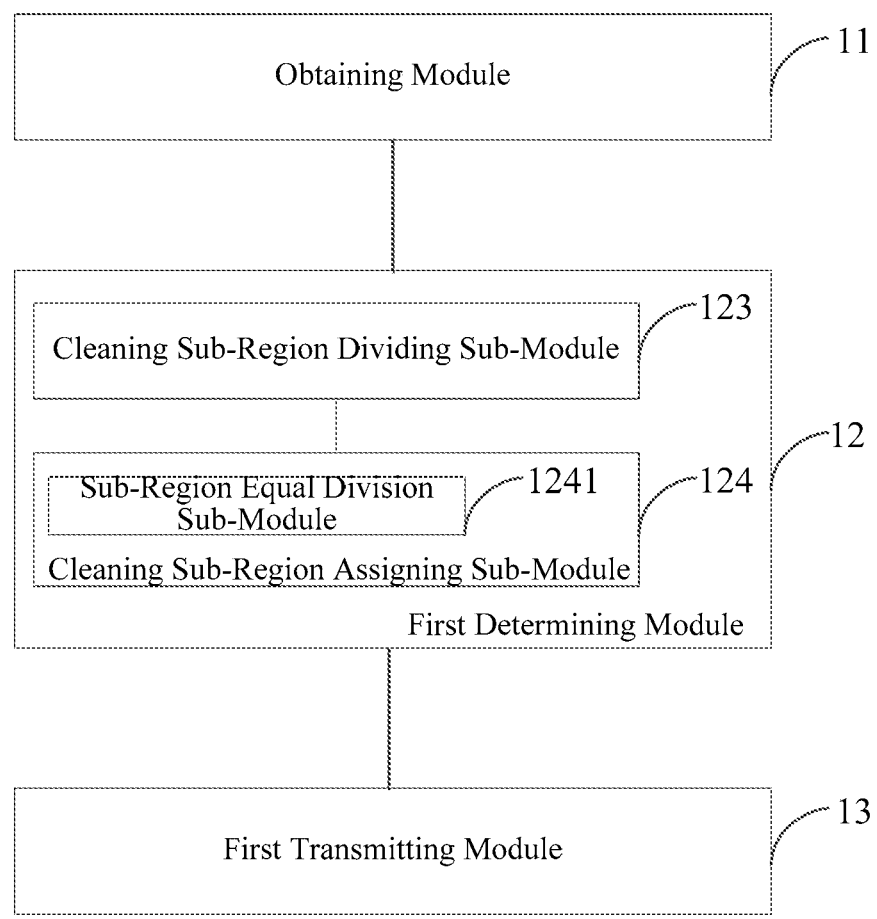
FIG. 32 is a block diagram of a cleaning sub-region dividing sub-module 124 in a device for controlling floor cleaning robots according to a first exemplary aspect of the present disclosure.

In an aspect, as illustrated in FIG. 32, the cleaning sub-path dividing sub-module 124 includes a sub-region equal division sub-module 1241.

The sub-region equal division sub-module 1241 is configured to equally divide the cleaning region in the cleaning task information into at least two cleaning sub-regions.

Figure 33:
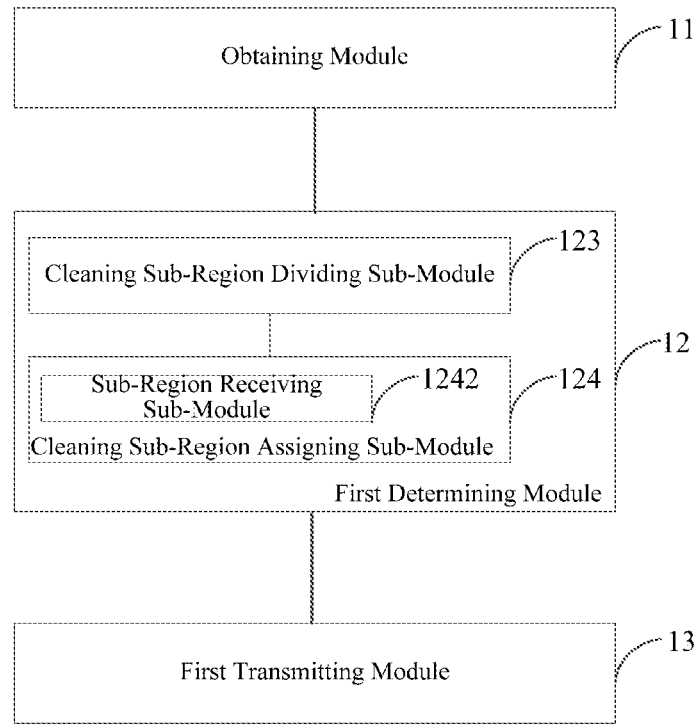
FIG. 33 is a block diagram of a cleaning sub-region dividing sub-module 124 in a device for controlling floor cleaning robots according to a second exemplary aspect of the present disclosure.

In an aspect, as illustrated in FIG. 33, the cleaning sub-path dividing sub-module 124 includes a sub-region receiving sub-module 1242.

The sub-region receiving sub-module 1242 is configured to receive from a user the cleaning region in the cleaning task information, which is divided into at least two cleaning sub-regions.

Figure 34:
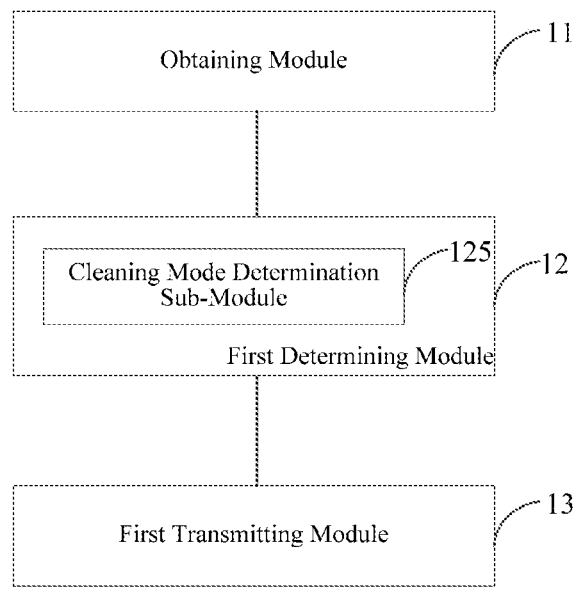
FIG. 34 is a block diagram of a first determination module 12 in a device for controlling floor cleaning robots according to a third exemplary aspect of the present disclosure.

In an aspect, as illustrated in FIG. 34, when the cleaning task information includes a cleanliness level after cleaning, the cleaning control information includes a cleaning mode and a cleaning start time.

The first determining module 12 includes a cleaning mode determination sub-module 125.

The cleaning mode determination sub-module 125 is configured to determine a cleaning mode for each floor cleaning robot that performs a cleaning task on the cleaning region according to the cleanliness level after cleaning in the cleaning task information, and a cleaning start time in the cleaning task information, as the cleaning control information for the floor cleaning robot, so that each of the floor cleaning robots performs a cleaning task at a corresponding cleaning start time according to a corresponding respective cleaning mode.

Figure 35:
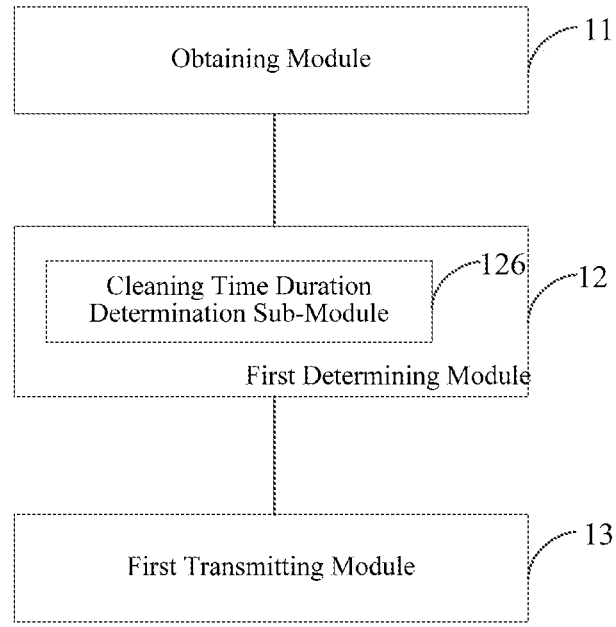
FIG. 35 is a block diagram of a first determination module 12 in a device for controlling floor cleaning robots according to a fourth exemplary aspect of the present disclosure.

The cleaning task information includes cleaning time duration. In an aspect, as illustrated in FIG. 35, the first determining module 12 includes a cleaning time duration determination sub-module 126.

The cleaning time duration determination sub-module 126 is configured to determine a cleaning time duration for the at least two floor cleaning robots according to the cleaning time duration in the cleaning task information, in which the cleaning time duration of each of the floor cleaning robots equals to the cleaning time duration in the cleaning task information, so that each of the floor cleaning robots performs the cleaning task within the cleaning time duration of the floor cleaning robot.

Figure 36:
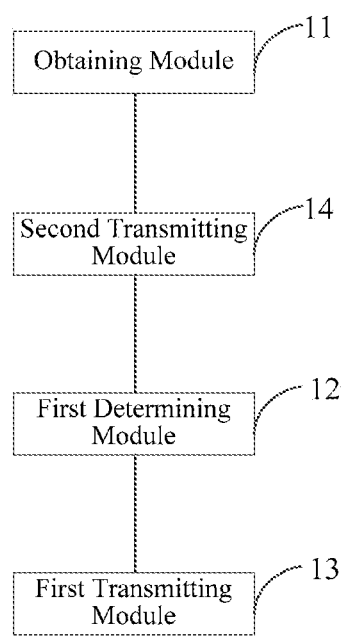
FIG. 36 is a block diagram of a device for controlling floor cleaning robots according to a second exemplary aspect of the present disclosure.

In an aspect, as illustrated in FIG. 36, the device further includes a second transmitting module 14.

The second transmitting module 14 is configured to transmit the cleaning task information obtained by the obtaining module 11 to a main floor cleaning robot of the at least two floor cleaning robots, so that the main floor cleaning robot determines the cleaning control information for the at least two floor cleaning robots according to the cleaning task information.

Figure 37:
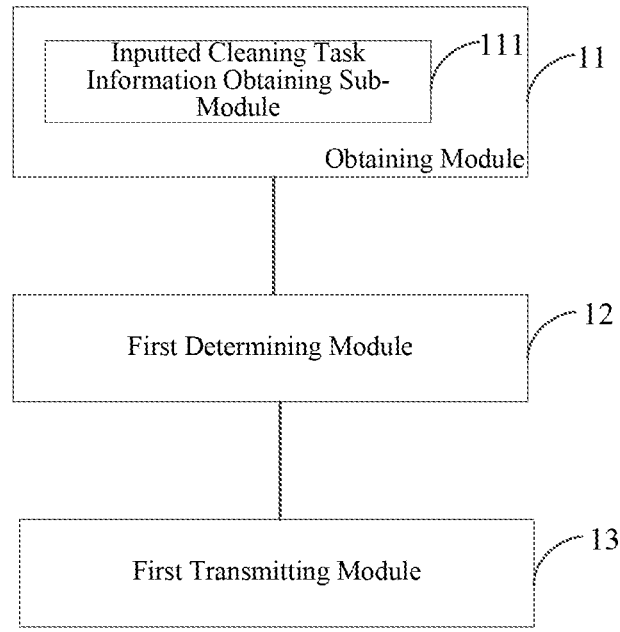
FIG. 37 is a block diagram of an obtaining module 11 in a device for controlling floor cleaning robots according to an exemplary aspect of the present disclosure.

In an aspect, as illustrated in FIG. 37, the obtaining module 11 includes an inputted cleaning task information obtaining sub-module 111.

The inputted cleaning task information obtaining sub-module 111 is configured to obtain the cleaning task information as inputted.

Figure 38:
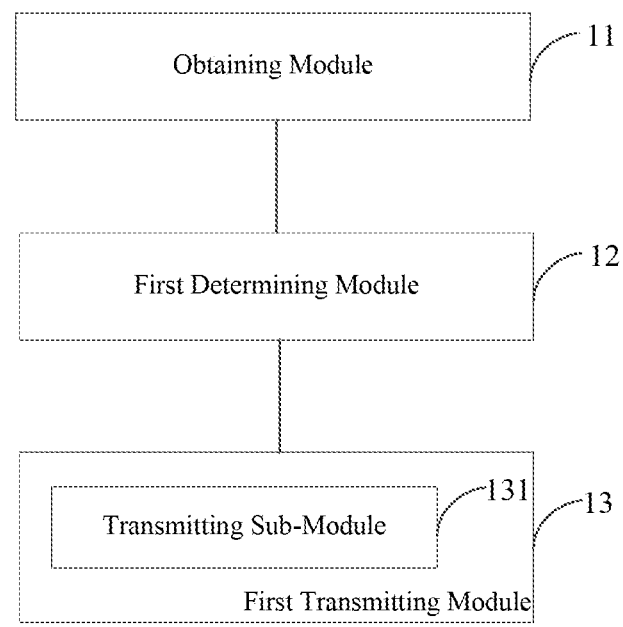
FIG. 38 is a block diagram of a first transmitting module 13 in a device for controlling floor cleaning robots according to an exemplary aspect of the present disclosure.

In an aspect, as illustrated in FIG. 38, the first transmitting module 13 includes a transmitting sub-module 131.

The transmitting sub-module 131 is configured to transmit each of the cleaning control information determined by the first determining module 12 to a main floor cleaning robot of the at least two floor cleaning robots, so that the main floor cleaning robot performs a cleaning task according to one piece of cleaning control information and transmits the other pieces of cleaning control information to at least one secondary floor cleaning robot of the at least two floor cleaning robots.

Figure 39:
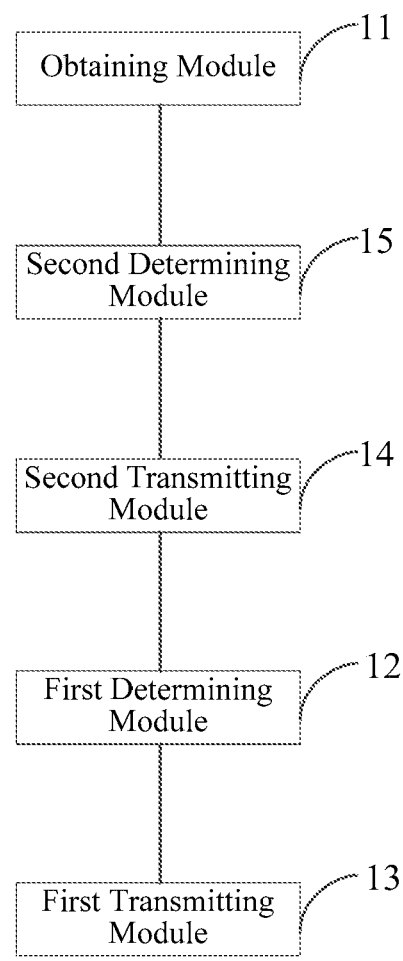
FIG. 39 is a block diagram of a device for controlling floor cleaning robots according to a third exemplary aspect of the present disclosure.

In an aspect, as illustrated in FIG. 39, the device further includes a second determining sub-module 15.

The second determining sub-module 15 is configured to determine a main floor cleaning robot and at least one secondary floor cleaning robot from the at least two floor cleaning robots.

The aspect of the present aspect further provides a device for controlling floor cleaning robots, including a processor and a memory configured to store computer readable instructions executable by the processor. The processor is configured to: obtain cleaning task information, wherein the cleaning task information includes an overall cleaning task; determine cleaning control information for at least two floor cleaning robots according to the cleaning task information, wherein the cleaning control information includes control information for each of the floor cleaning robots; and transmit each of the cleaning control information to a corresponding floor cleaning robot, so that each of the floor cleaning robots performs a cleaning task according to the corresponding cleaning control information.

The above processer can be further configured as below.

The cleaning task information includes a cleaning region, and the cleaning control information includes cleaning sub-regions.

Determining cleaning control information for at least two floor cleaning robots according to the cleaning task information includes: dividing the cleaning path in the cleaning task information into at least two cleaning sub-paths; assigning each of the cleaning sub-paths to at least one floor cleaning robot as cleaning control information for the floor cleaning robot, so that each of the floor cleaning robots performs a cleaning task according to a corresponding cleaning sub-path.

Dividing the cleaning path in the cleaning task information into at least two cleaning sub-paths includes: equally dividing the cleaning path in the cleaning task information into at least two cleaning sub-paths; or, receiving from a user the cleaning path in the cleaning task information, which is divided into at least two cleaning sub-paths.

The cleaning task information includes a cleaning region, and the cleaning control information includes cleaning sub-regions.

Determining cleaning control information for at least two floor cleaning robots according to the cleaning task information includes: dividing the cleaning region in the cleaning task information into at least two cleaning sub-regions; and assigning each of the cleaning sub-regions to at least one floor cleaning robot as cleaning control information for the floor cleaning robot, so that each of the floor cleaning robots performs a cleaning task according to a corresponding cleaning sub-region.

Dividing the cleaning region in the cleaning task information into at least two cleaning sub-regions includes: equally dividing the cleaning region in the cleaning task information into at least two cleaning sub-regions; or, receiving from a user the cleaning region in the cleaning task information, which is divided into at least two cleaning sub-regions.

The cleaning task information includes a cleanliness level after cleaning, and the cleaning control information includes a cleaning mode and a cleaning start time.

Determining cleaning control information for at least two floor cleaning robots according to the cleaning task information includes: determining a cleaning mode and a cleaning start time in the cleaning task information for each floor cleaning robot that performs a cleaning task on the cleaning region, according to the cleanliness level after cleaning in the cleaning task information, as the cleaning control information for the floor cleaning robot, so that each of the floor cleaning robots performs a cleaning task at a corresponding cleaning start time according to a corresponding cleaning mode.

The cleaning task information includes cleaning time duration.

Determining cleaning control information for at least two floor cleaning robots according to the cleaning task information includes: determining a cleaning time duration for the at least two floor cleaning robots according to the cleaning time duration in the cleaning task information, wherein the cleaning time duration of each of the floor cleaning robots equals to the cleaning time duration in the cleaning task information, so that each of the floor cleaning robots performs the cleaning task within the cleaning time duration of the floor cleaning robot.

Determining cleaning control information for at least two floor cleaning robots according to the cleaning task information includes: transmitting the cleaning task information to a main floor cleaning robot of the at least two floor cleaning robots, so that the main floor cleaning robot determines the cleaning control information for the at least two floor cleaning robots according to the cleaning task information.

Obtaining cleaning task information includes: obtaining cleaning task information as inputted.

Transmitting each of the cleaning control information to the corresponding floor cleaning robot includes: transmitting each of the cleaning control information to a main floor cleaning robot of the at least two floor cleaning robots, so that the main floor cleaning robot performs a cleaning task according to one piece of cleaning control information and transmits the other pieces of cleaning, control information to at least one secondary floor cleaning robot of the at least two floor cleaning robots; and further includes: determining a main floor cleaning robot and at least one secondary floor cleaning robot from the at least two floor cleaning robots.

As for the device in the foregoing aspects, specific manners of modules performing operations have been described in details with reference to the aspects related to the corresponding methods, which is not particularly explained here.

Figure 40:
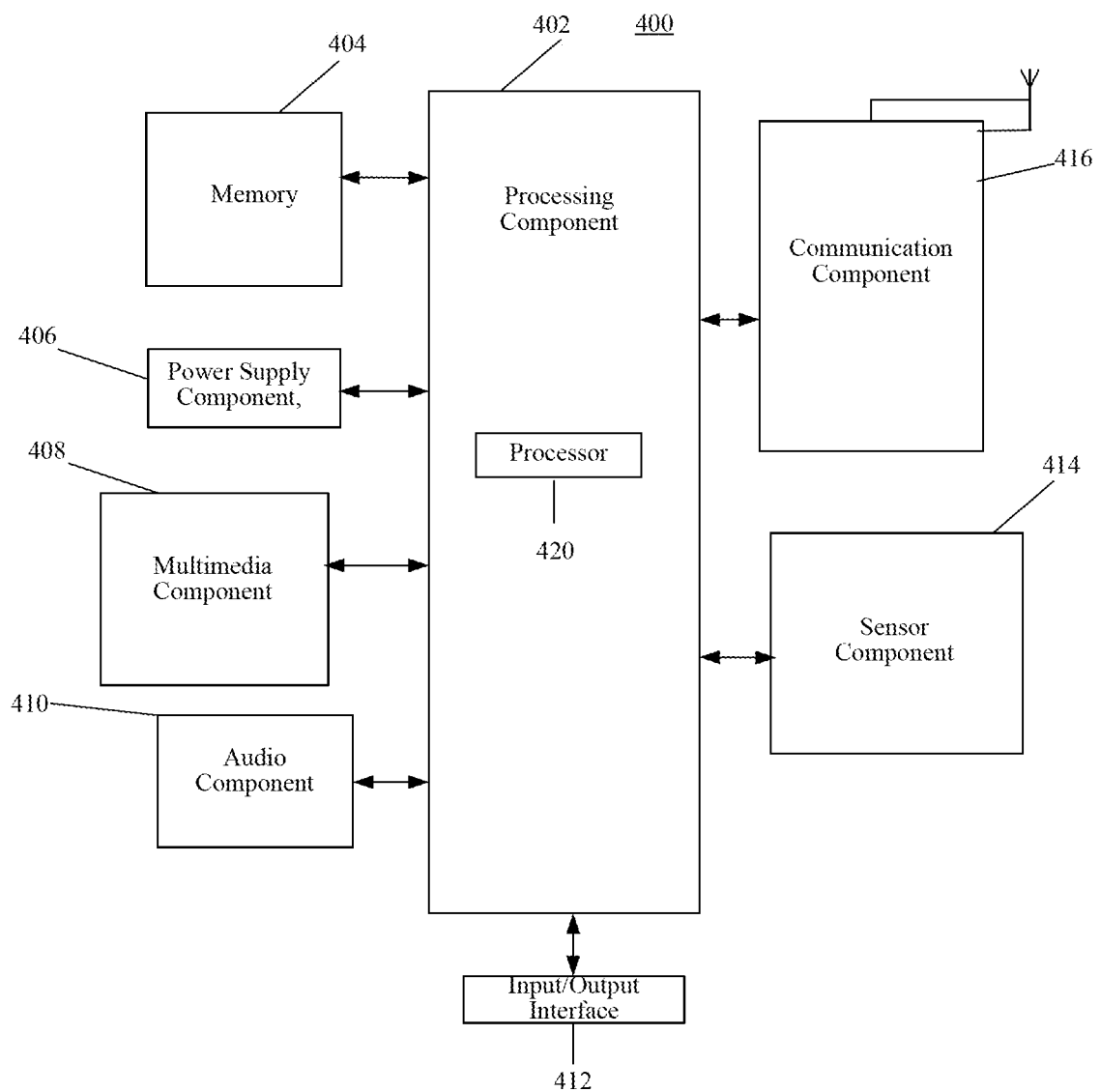
FIG. 40 is a block diagram of a device for controlling floor cleaning robots according to an exemplary aspect of the present disclosure.

FIG. 40 is a block diagram of a device 400 for controlling floor cleaning robots according to an exemplary aspect. The device is applicable for terminal devices. For example, the device 400 can be one of mobile phone, computer, digital broadcasting receiver, message transceiver, game control panel, tablet device, medical device, fitness facility, personal digital assistant and the like.

The device 400 can include one or more component of: a processing component 402, a memory 404, a power supply component 406, a multimedia component 408, an audio component 410, an input/output (I/O) interface 412, a sensor component 414 and a communication component 416.

The processing component 402 usually controls an operation of the entire device 400 such as operations related to display, phone calls, data communication camera operation and record operation. The processing component 402 can include one or more processors 420 configured to execute instructions so as to complete all of or part of steps of the above-mentioned method. Besides, the processing component 402 can include one more module for the convenience of interactions between the processing component 402 and other components. For example, the processing component 402 can include a multimedia module for convenience of interactions between the multimedia component 408 and the processing component 402.

The memory 404 is configured to store various types of data to support the operations of the device 400. Examples of these data include: instructions for any program applications or methods operated on the device 400, data of contacts, data of contact list messages, pictures, videos and the like. The memory 404 can be implemented as any type of volatile or non-volatile storage device or combination thereof, such as Static Random Access Memory (SRAM), Electrically Erasable Programmable Read-Only Memory (EEPROM), Electrically Programmable Read-Only-Memory (EPROM), Programmable Read-Only Memory (PROM), read only memory (ROM), magnetic memory, flash memory, magnetic disk or optical disk.

The power supply component 406 supplies various components with electric power. The power supply component 406 can include a power supply management system, one or more power supply, and other components related to generation, management and assignment of the electric power.

The multimedia component 408 includes a screen which provides an output interface between the device 400 and the user. In some examples, the screen can include liquid crystal display (LCD) and touch panel (TP). In the case where the screen includes touch panel, it can be implemented as a touch screen so as to receive input signals from the user. The control panel includes one or more touch sensor to sense touching and sliding operations and gestures on the touch panel. The touch sensor can not only sense a boundary of a touching or sliding action but also detect a duration time and a pressure related to the touching or sliding operation. In some examples, the multimedia component 408 includes a front-facing camera and/or a rear camera. When the device 400 is in an operation mode, for example, shooting mode or video mode, the front-facing camera and/or the rear camera can receive multimedia data from the outside. Each of the front-facing camera and the rear camera can be a fixed optical lens system or provided with a focus length and an optical zooming capacity.

The audio component 410 is configured to output and/or input audio signals. For example, the audio component 410 includes a microphone (MIC); when the device is in the operation mode, for example, calling mode, recording mode and voice recognition mode, the MIC is configured to receive outside audio signals. The audio signals as received can be further stored in the memory 404 or transmitted through the communication component 416. In some examples, the audio component 410 further includes a loudspeaker for outputting audio signals.

The I/O interface 412 provides an interface between the processing component 402 and a peripheral interface module. The peripheral interface module above can be a keyboard, a click wheel, a button and the like. The button can include, but not limited to a homepage button, a sound volume button, an activating button and a locking button.

The sensor component 414 includes one or more sensor configured to provide the device 400 with condition assessments of various aspects. For example, the sensor component 414 can detect an on/off status of the device 400 and a relative positioning of components, e.g., the component is a displayer or a small keyboard of the device 400; the sensor component 414 can further detect a change of position of the device 400 or one component of the device 400, detect whether a contact between the user and the device 400 exists or not, and detect an orientation or an acceleration/deceleration of the device 400 and a change of temperature of the device 400. The sensor component 414 can include a proximity sensor configured to detect an existent of a nearby object without any physical contact. The sensor component 414 can further include optical sensor such as CMOS or CCD imaging sensor, which is used in imaging application. In some examples, the sensor component 414 can further include acceleration sensor, gyroscope sensor, magnetic sensor, pressure sensor or temperature sensor.

The communication component 416 is configured to facilitate establishing wireless or wired communication between the device 400 and other devices. The device 400 can be connected to a wireless network based on communication standards such as Wi-Fi, 2G or 3G, or a combination thereof. In an exemplary aspect, the communication component 416 receives broadcast signals or broadcast-related signals from an external broadcast management system through broadcast channels. In an exemplary aspect, the communication component 416 can further include a near field communication (NFC) module to facilitate junction service. For example, the NFC module can be implemented on the basis of radio frequency identification (RFID) technology, infra-red data association (IrDA) technology, Ultra-wide Bandwidth (UWB) technology, Bluetooth (BT) technology and other technologies.

In an exemplary aspect, the device 400 can be implemented by one or more application specific integrated circuit (ASIC), digital signal processor (DSP), digital signal processing device (DSPD), programmable logic device (PLD), field-programmable gate array (FPGA), controller, microcontroller, microprocessor or other electronic components, so as to perform the method above.

In an exemplary aspect, it is further provided a permanent computer-readable storage medium including instructions, for example, a memory 404 including instructions. The instructions above can be executed by the processer 420 of the device 400 to complete the method above. For example, the permanent computer-readable storage medium can be ROM, random-access memory (RAM), CD-ROM, tape, floppy disk, optical data memory and the like.

A permanent computer-readable storage medium includes instructions configured to enable the device 400 to perform the device for controlling floor cleaning robots as mentioned above, when executed by the processor of the device 400.

The method includes: obtaining cleaning task information, the cleaning task information includes an overall cleaning task; determining cleaning control information for at least two floor cleaning robots according to the cleaning task information, the cleaning control information includes control information for each of the floor cleaning robots; transmitting each of the cleaning control information to a corresponding floor cleaning robot, so that each of the floor cleaning robots performs a cleaning task according to the corresponding cleaning control information.

It is noted that the various modules, sub-modules, units, and components in the present disclosure can be implemented using any suitable technology. For example, a module may be implemented using circuitry, such as an integrated circuit (IC). As another example, a module may be implemented as a processing circuit executing software instructions.

Other aspects of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as illustrative only, with a true scope and spirit of the disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A method of controlling floor cleaning robots, comprising:
    obtaining cleaning task information that includes an overall cleaning task, a cleaning time duration and a cleanliness level after cleaning expected by a user;
    determining cleaning control information for a plurality of floor cleaning robots based on the cleaning task information, wherein the cleaning control information includes control information, a cleaning mode, and a cleaning start time for each one of the plurality of floor cleaning robots, wherein determining the cleaning control information for the plurality of floor cleaning robots includes:

determining the cleaning mode for each one of the floor cleaning robots that performs a cleaning task on a cleaning region based on the cleanliness level after cleaning in the cleaning task information; and determining a time interval based on the cleaning time duration, a preset operating time duration for each of the floor cleaning robots and the number of the floor cleaning robots, and determining the cleaning start time for each of the plurality of floor cleaning robots based on the cleaning start time of a floor cleaning robot that firstly performs the cleaning task and the time interval; and transmitting the cleaning control information to each one of the plurality of floor cleaning robots, so that each one of the floor cleaning robots performs a cleaning task based on the corresponding cleaning control information at the corresponding cleaning start time according to the corresponding cleaning mode.

2. The method according to claim 1, wherein the cleaning task information includes a cleaning path, and the cleaning control information includes cleaning sub-paths, and wherein determining the cleaning control information for the plurality of floor cleaning robots based on the cleaning task information includes:

dividing the cleaning path in the cleaning task information into a plurality of cleaning sub-paths;

assigning each one of the plurality of cleaning sub-paths to at least one of the plurality of floor cleaning robots as cleaning control information for the floor cleaning robot, so that each one of the floor cleaning robots performs a cleaning task based on the corresponding cleaning sub-path.

3. The method according to claim 2, wherein dividing the cleaning path in the cleaning task information into the plurality of cleaning sub-paths includes one of:

equally dividing the cleaning path in the cleaning task information into the plurality of cleaning sub-paths; and receiving from a user the cleaning path in the cleaning task information, which is divided into the plurality of cleaning sub-paths.

4. The method according to claim 2, wherein the cleaning task information includes a cleaning region, and the cleaning control information includes cleaning sub-regions, and wherein determining the cleaning control information for the plurality of floor cleaning robots based on the cleaning task information includes:

dividing the cleaning region in the cleaning task information into a plurality of cleaning sub-regions;

assigning each one of the plurality of cleaning sub-regions to at least one of the floor cleaning robots as cleaning control information for the floor cleaning robot, so that each one of the floor cleaning robots performs a cleaning task based on the corresponding cleaning sub-region.

5. The method according to claim 4, wherein dividing the cleaning region in the cleaning task information into the plurality of cleaning sub-regions includes one of:

equally dividing the cleaning region in the cleaning task information into the plurality of cleaning sub-regions; and receiving from a user the cleaning region in the cleaning task information, which is divided into the plurality of cleaning sub-regions.

6. The method according to claim 2, wherein determining the cleaning control information for the plurality of floor cleaning robots based on the cleaning time duration in the cleaning task information includes:

determining a cleaning time duration for the plurality of floor cleaning robots based on the cleaning time duration in the cleaning task information, wherein the cleaning time duration of each one of the floor cleaning robots equals to the cleaning time duration in the cleaning task information, so that the cleaning task of each one of the floor cleaning robots is performed within the cleaning time duration of the floor cleaning robot.

7. The method according to claim 2, further comprising:

determining a main floor cleaning robot and at least one secondary floor cleaning robot from the plurality of floor cleaning robots, wherein determining the cleaning control information for the plurality of floor cleaning robots based on the cleaning task information includes:

transmitting the cleaning task information to the main floor cleaning robot so that the main floor cleaning robot determines the cleaning control information for the plurality of floor cleaning robots based on the cleaning task information.

8. The method according to claim 2, wherein obtaining the cleaning task information includes inputted cleaning task information.

9. The method according to claim 1, further comprising:

determining a main floor cleaning robot and at least one secondary floor cleaning robot from the plurality of floor cleaning robots, wherein transmitting the cleaning control information to the corresponding floor cleaning robots includes:

transmitting the cleaning control information to the main floor cleaning robot, so that the main floor cleaning robot performs a cleaning task according to a cleaning control information and transmits the other cleaning control information to the at least one secondary floor cleaning robot.

10. A device for controlling floor cleaning robots, comprising:

circuitry configured to:

obtain cleaning task information that includes an overall cleaning task, a cleaning time duration and a cleanliness level after cleaning expected by a user;

determine cleaning control information for a plurality of floor cleaning robots based on the cleaning task information, wherein the cleaning control information includes control information, a cleaning mode, and a cleaning start time for each one of the plurality of floor cleaning robots, wherein determining the cleaning control information for the plurality of floor cleaning robots includes:

determining the cleaning mode for each one of the floor cleaning robots that performs a cleaning task on a cleaning region based on the cleanliness level after cleaning in the cleaning task information; and determining a time interval based on the cleaning time duration, a preset operating time duration for each of the floor cleaning robots and the number of the floor cleaning robots, and determining the cleaning start time for each of the plurality of floor cleaning robots based on the cleaning start time of a floor cleaning robot that firstly performs the cleaning task and the time interval; and transmit the cleaning control information to each one of the plurality of floor cleaning robots, so that each one of the floor cleaning robots performs a cleaning task based on the corresponding cleaning control information at the corresponding cleaning start time according to the corresponding cleaning mode.

11. The device according to claim 10, wherein the cleaning task information includes a cleaning path, and the cleaning control information includes cleaning sub-paths, and
wherein when determining the cleaning control information for the plurality of floor cleaning robots based on the cleaning task information, the circuitry is configured to:
divide the cleaning path in the cleaning task information into a plurality of cleaning sub-paths;
assign each one of the plurality of cleaning sub-paths to at least one of the plurality of floor cleaning robots as cleaning control information for the floor cleaning robot, so that each one of the floor cleaning robots performs a cleaning task based on the corresponding cleaning sub-path.

12. The device according to claim 11, wherein when dividing the cleaning path in the cleaning task information into the plurality of cleaning sub-paths, the circuitry is configured to:
equally divide the cleaning path in the cleaning task information into the plurality of cleaning sub-paths; or
receive from a user the cleaning path in the cleaning task information, which is divided into the plurality of cleaning sub-paths.

13. The device according to claim 11, wherein the cleaning task information includes a cleaning region, and the cleaning control information includes cleaning sub-regions, and
wherein when determining the cleaning control information for the plurality of floor cleaning robots based on the cleaning task information, the circuitry is configured to:
divide the cleaning region in the cleaning task information into a plurality of cleaning sub-regions;
assign each one of the plurality of cleaning sub-regions to at least one of the floor cleaning robots as cleaning control information for the floor cleaning robot, so that each one of the floor cleaning robots performs a cleaning task based on the corresponding cleaning sub-region.

14. The device according to claim 13, wherein when dividing the cleaning region in the cleaning task information into the plurality of cleaning sub-regions, the circuitry is configured to:
equally divide the cleaning region in the cleaning task information into the plurality of cleaning sub-regions; or
receive from a user the cleaning region in the cleaning task information, which is divided into the plurality of cleaning sub-regions.

15. The device according to claim 11, wherein when determining the cleaning control information for the plurality of floor cleaning robots based on the cleaning time duration in the cleaning task information, the circuitry is configured to:
determine a cleaning time duration for the plurality of floor cleaning robots based on the cleaning time duration in the cleaning task information, wherein the cleaning time duration of each one of the floor cleaning robots equals to the cleaning time duration in the cleaning task information, so that the cleaning task of each one of the floor cleaning robots is performed within the cleaning time duration of the floor cleaning robot.

16. The device according to claim 11, wherein the circuitry is further configured to:
determine a main floor cleaning robot and at least one secondary floor cleaning robot from the plurality of floor cleaning robots,
wherein when determining the cleaning control information for the plurality of floor cleaning robots based on the cleaning task information, the circuitry is configured to:
transmit the cleaning task information to the main floor cleaning robot so that the main floor cleaning robot determines the cleaning control information for the plurality of floor cleaning robots based on the cleaning task information.

17. The device according to claim 10, wherein the circuitry is further configured to:
determine a main floor cleaning robot and at least one secondary floor cleaning robot from the plurality of floor cleaning robots,
wherein when transmitting the cleaning control information to the corresponding floor cleaning robots, the circuitry is configured to:
transmit the cleaning control information to the main floor cleaning robot, so that the main floor cleaning robot performs a cleaning task according to a cleaning control information and transmits the other cleaning control information to the at least one secondary floor cleaning robot.

18. A device for controlling floor cleaning robots, comprising:
a processor;
a memory configured to store computer-readable instructions executed by the processor,
wherein the processor is configured to:
obtain cleaning task information that includes an overall cleaning task, a cleaning time duration and a cleanliness level after cleaning expected by a user;
determine cleaning control information for a plurality of floor cleaning robots based on the cleaning task information, wherein the cleaning control information includes control information, a cleaning mode, and a cleaning start time for each one of the plurality of floor cleaning robots, wherein determining the cleaning control information for the plurality of floor cleaning robots includes:
determining the cleaning mode for each one of the floor cleaning robots that performs a cleaning task on a cleaning region based on the cleanliness level after cleaning in the cleaning task information; and
determining a time interval based on the cleaning time duration, a preset operating time duration for each of the floor cleaning robots and the number of the floor cleaning robots, and determining the cleaning start time for each of the plurality of floor cleaning robots based on the cleaning start time of a floor cleaning robot that firstly performs the cleaning task and the time interval; and
transmit the cleaning control information to each one of the plurality of floor cleaning robots, so that each one of the floor cleaning robots performs a cleaning task based on the corresponding cleaning control information at the corresponding cleaning start time according to the corresponding cleaning mode.

19. The method according to claim 2, wherein the plurality of floor cleaning robots includes a first cleaning robot and a second cleaning robot, wherein the cleaning control information controls the first cleaning robot to clean a first cleaning sub-path of the plurality of cleaning sub-paths to a first cleanliness level at a first start time, and controls the second cleaning robot to clean the first cleaning sub-path to a second cleanliness level that is cleaner than the first cleanliness level at a second start time that is later than the first start time.

* * * * *